US012812718B2

(12) United States Patent
Wang et al.

(10) Patent No.: US 12,812,718 B2
(45) Date of Patent: Nov. 24, 2026

(54) NODES, USER EQUIPMENTS AND METHODS THEREOF

(71) Applicant: Samsung Electronics Co., Ltd., Gyeonggi-do (KR)

(72) Inventors: Weiwei Wang, Beijing (CN); Hong Wang, Beijing (CN); Lixiang Xu, Beijing (CN)

(73) Assignee: Samsung Electronics Co., Ltd (KR)

( * ) Notice: Subject to any disclaimer, the term of this patent is extended or adjusted under 35 U.S.C. 154(b) by 234 days.

(21) Appl. No.: 18/033,198

(22) PCT Filed: Oct. 21, 2021

(86) PCT No.: PCT/KR2021/014809
§ 371 (c)(1),
(2) Date: Apr. 21, 2023

(87) PCT Pub. No.: WO2022/086217
PCT Pub. Date: Apr. 28, 2022

(65) Prior Publication Data
US 2023/0388882 A1 Nov. 30, 2023

(30) Foreign Application Priority Data
Oct. 21, 2020 (CN) ......................... 202011131907.3

(51) Int. Cl.
*H04W 76/20* (2018.01)
*H04W 36/18* (2009.01)

(52) U.S. Cl.
CPC .......... *H04W 76/20* (2018.02); *H04W 36/185* (2023.05)

(58) Field of Classification Search
CPC ..... H04W 76/20; H04W 36/18; H04W 36/00; H04W 36/02; H04W 36/08; H04W 36/30; H04W 36/36; H04W 28/02; H04W 28/24; H04W 76/15; H04W 76/19; H04W 76/27; H04W 76/30; H04L 5/00
USPC .......................................................... 370/331
See application file for complete search history.

(56) References Cited

U.S. PATENT DOCUMENTS 10,616,932 B2 * 4/2020 Hong .................... H04W 76/12
10,687,263 B2 * 6/2020 Paladugu ............ H04W 12/033
11,026,142 B2 * 6/2021 Kubota ................... H04L 43/10
11,202,333 B2 * 12/2021 Zhang ................ H04W 12/037
(Continued)

FOREIGN PATENT DOCUMENTS

| | | |
|---|---|---|
| CN | 111225396 | 6/2020 |
| EP | 3713297 | 9/2020 |
| WO | WO 2018/203739 | 11/2018 |

OTHER PUBLICATIONS

PCT/ISA/210 Search Report issued on PCT/KR2021/014809, dated Feb. 4, 2022, pp. 3.

(Continued)

*Primary Examiner* — Man U Phan
(74) *Attorney, Agent, or Firm* — The Farrell Law Firm, P.C.

(57) ABSTRACT

This application provides nodes, user equipment, and methods performed by the nodes and user equipment in a wireless communication system. A method performed by a first node includes transmitting a first message to a second node, wherein the first message includes configuration information related to activation/deactivation of a secondary cell group (SCG).

4 Claims, 13 Drawing Sheets

(56) References Cited

U.S. PATENT DOCUMENTS 11,356,904 B2 * 6/2022 Kim .................. H04W 28/0263
11,388,642 B2 * 7/2022 Paladugu ............ H04W 12/033
11,546,811 B2 * 1/2023 Xu .......................... H04L 67/12
11,558,793 B2 * 1/2023 Awoniyi-Oteri .... H04W 36/362
11,792,706 B2 * 10/2023 Yao ..................... H04W 36/185 370/331
11,818,750 B2 * 11/2023 Awoniyi-Oteri .... H04W 36/185
11,882,486 B2 * 1/2024 Kim ...................... H04W 76/22
11,943,670 B2 * 3/2024 Kim ........................ H04L 69/04
11,950,312 B2 * 4/2024 Hori ...................... H04W 80/02
12,156,081 B2 * 11/2024 Kim ...................... H04W 12/03
12,193,097 B2 * 1/2025 Hori .................... H04W 36/185
12,207,149 B2 * 1/2025 Zhang ................... H04W 36/18
12,231,981 B2 * 2/2025 Kim .................... H04W 36/087
12,262,252 B2 * 3/2025 Kim ...................... H04W 36/08
12,262,255 B2 * 3/2025 Kim .................. H04W 36/0055
2019/0253945 A1 8/2019 Paladugu et al.
2019/0387569 A1 12/2019 Martinez Tarradell et al.
2020/0314714 A1 10/2020 Jung et al.
2023/0262565 A1 * 8/2023 Chang ................. H04W 36/362 455/437
2023/0292205 A1 * 9/2023 Ramachandra ... H04W 36/0079
2025/0175845 A1 * 5/2025 Jia ..................... H04W 36/0058

OTHER PUBLICATIONS

PCT/ISA/237 Written Opinion issued on PCT/KR2021/014809, dated Feb. 4, 2022, pp. 5.

Huawei, "(TP for NR_IAB BL CR TS 38.473): Miscellaneous stage 3 correction", 3GPP TSG-RAN WG3 Meeting #108-e R3-204248 Online, Jun. 1-11, 2020, pp. 30.

Ericsson, "Early data forwarding and CU-UP DL transmission start/stop", 3GPP TSG-RAN WG3 Meeting #108-e R3-203800 Jun. 1-12, 2020 Online, pp. 5.

Chinese Office Action dated Sep. 29, 2026 issued in counterpart application No. 202011131907.3, 10 pages.

* cited by examiner

NODES, USER EQUIPMENTS AND METHODS THEREOF

CROSS-REFERENCE TO RELATED APPLICATIONS

This application is a U.S. National Phase Entry of PCT International Application No. PCT/KR2021/014809, which was filed on Oct. 21, 2021, and claims priority to Chinese Patent Application No. 202011131907.3, which was filed in the Chinese Intellectual Property Office on Oct. 21, 2020, the entire disclosure of each of which is incorporated herein by reference.

TECHNICAL FIELD

The present disclosure relates to wireless communication technology, and in particular, to devices and methods for exchanging context related to a secondary cell group (SCG) between base stations and between base stations and user equipments (UE).

BACKGROUND ART

To meet the demand for wireless data traffic having increased since deployment of 4th generation (4G) communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless communication is one of the most successful innovations in modern history. Recently, the number of subscribers to wireless communication services has exceeded 5 billion, and it continues to grow rapidly. Due to the increasing popularity of smart phones and other mobile data devices (for example, tablet computers, notebook computers, netbooks, e-book readers and machine-type devices) in consumers and enterprises, a demand for wireless data services is growing rapidly. In order to meet the rapid growth of mobile data services and support new applications and deployments, it is essential to improve the efficiency and coverage of wireless interfaces.

DISCLOSURE OF INVENTION

Technical Problem

The present disclosure provides nodes, user equipment and methods for exchanging context related to a secondary cell group (SCG) between base stations and between base stations and user equipments.

Solution to Problem

According to an aspect of the present disclosure, there is provided a method performed by a first node in a wireless communication system. The method includes transmitting a first message to a second node, wherein the first message includes configuration information related to activation/deactivation of a secondary cell group (SCG).

According to an aspect of the present disclosure, there is provided a method performed by a second node in a wireless communication system. The method includes receiving a first message from a first node, wherein the first message includes configuration information related to activation/deactivation of a secondary cell group (SCG).

In the method according to the embodiment of the present disclosure, in the case that the first message is related to configuration of activation/deactivation of the SCG, the first message may include at least one of the following information: configuration information related to data transmission and information related to activity status detection time.

In the method according to the embodiment of the present disclosure, the configuration information related to data transmission may include at least one of the following information: first threshold information, first time length information, and first applicable information.

In the method according to the embodiment of the present disclosure, the first applicable information may include at least one of the following information: identification information a user equipment, identification information of a protocol data unit (PDU) session, identification information of a quality of service (QoS) flow and identification information of a data radio bearer (DRB).

In the method according to the embodiment of the present disclosure, the information related to activity status detection time may include at least one of the following information: second time length information and second applicable information.

In the method according to the embodiment of the present disclosure, the second applicable information may include at least one of the following information: identification information of a user equipment, identification information of a protocol data unit (PDU) session, identification information of a quality of service (QoS) flow and identification information of a data radio bearer (DRB).

In the method according to the embodiment of the present disclosure, in the case that the first message is related to detection of activation/deactivation of the SCG, the first message may include at least one of the following information: information related to activity status detection result and indication information for data transmission.

In the method according to the embodiment of the present disclosure, the information related to activity status detection result may include at least one of the following information: activity status indication information, third time length information and third applicable information.

In the method according to the embodiment of the present disclosure, the third applicable information may include at least one of the following information: identification information of a user equipment, identification information of a protocol data unit (PDU) session, identification information of a quality of service (QoS) flow and identification information of a data radio bearer (DRB).

In the method according to the embodiment of the present disclosure, the indication information for data transmission may include at least one of the following information: indication information for data arrival and fourth applicable information.

In the method according to the embodiment of the present disclosure, the fourth applicable information may include at least one of the following information: identification information of a user equipment, identification information of a protocol data unit (PDU) session, identification information of a quality of service (QoS) flow and identification information of a data radio bearer (DRB).

In the method according to the embodiment of the present disclosure, in the case that the first message is related to notification of activation/deactivation of the SCG, the first message includes at least one of the following information: control information related to activity status and notification information related to activity status.

The method of the first node according to the embodiment of the present disclosure may further include: receiving a second message from the second node.

In the method according to the embodiment of the present disclosure, the first node is a master node and the second node is a secondary node; or the first node is a secondary node, and the second node is a master node; or the first node is a control plane portion of a central unit of a base station, and the second node is a user plane portion of the central unit of the base station; or the first node is a user plane portion of a central unit of a base station, and the second node is a control plane portion of the central unit of the base station; or the first node is a central unit of a base station or a control plane portion of the central unit of the base station, and the second node is a distributed unit of the base station; or the first node is a distributed unit of a base station, and the second node is a central unit of the base station or a control plane portion of the central unit of the base station; or the first node is a distributed unit of a base station, and the second node is a user plane portion of a central unit of the base station; or the first node is a user plane portion of a central unit of a base station, and the second node is a distributed unit of the base station.

The method according to the embodiment of the present disclosure may further include: transmitting a third message to the user equipment, wherein the third message includes information related to configuration of the data transmission of the user equipment on the SCG.

According to another aspect of the present disclosure, there is provided a method performed by a third node in a wireless communication system. The method includes transmitting a fourth message to a user equipment, wherein the fourth message includes information related to configuration of activation/deactivation of the secondary cell group (SCG) of the user equipment.

According to another aspect of the present disclosure, there is provided a method performed by a user equipment in a wireless communication system. The method includes receiving a fourth message from a third node, wherein the fourth message includes information related to a configuration of activation/deactivation of a secondary cell group (SCG) of the user equipment.

In the method according to the embodiment of the present disclosure, the fourth message may include at least one of the following information: configuration information related to SCG status, configuration information related to data transmission, and information related to SCG activity status detection time.

In the method according to the embodiment of the present disclosure, the configuration information related to data transmission may include at least one of the following information: second threshold information, fourth time length information and fifth applicable information.

In the method according to the embodiment of the present disclosure, the fifth applicable information may include at least one of the following information: identification information of a user equipment, identification information of a protocol data unit (PDU) session, identification information of a quality of service (QoS) flow and identification information of a data radio bearer (DRB).

In the method according to the embodiment of the present disclosure, the information related to SCG activity status detection time may include at least one of the following information: fifth time length information and sixth applicable information.

In the method according to the embodiment of the present disclosure, the sixth applicable information may include at least one of the following information: identification information of a user equipment, identification information of a protocol data unit (PDU) session, identification information of a quality of service (QoS) flow and identification information of a data radio bearer (DRB).

The method according to the embodiment of the present disclosure may further include: receiving a fifth message from the user equipment, wherein the fifth message includes information related to notifying the status of the SCG.

In the method according to the embodiment of the present disclosure, the fifth message may include at least one of the following information: indication information for requiring a SCG to transmit data, and indication information for not requiring a SCG to transmit data.

The method according to the embodiment of the present disclosure may further include: detecting the activity status of the SCG by the user equipment.

The method of the user equipment according to the embodiment of the present disclosure may further include: transmitting a fifth message to the third node, wherein the fifth message includes information related to notifying the status of the SCG.

In the method according to the embodiment of the present disclosure, the fifth message may include at least one of the following information: indication information for requiring a SCG to transmit data, and indication information for not requiring a SCG to transmit data.

According to another aspect of the present disclosure, there is provided a method performed by a fourth node in a wireless communication system. The method includes: transmitting a sixth message to a fifth node, wherein the sixth message includes information related to configuring data transmission of the fifth node.

According to another aspect of the present disclosure, there is provided a method performed by a fifth node in a wireless communication system. The method includes: receiving a sixth message from a fourth node, wherein the sixth message includes information related to configuring data transmission of the fifth node, and the fifth node determines the transmission of user data according to the sixth message.

In the method according to the embodiment of the present disclosure, the sixth message may include at least one of the following information: identification information of a user equipment, information related to radio bearer, information of dual active protocol stack (DAPS) radio bearers, information of non-DAPS radio bearers and fourth indication information for data transmission.

In the method according to the embodiment of the present disclosure, the information related to radio bearer may include at least one of the following information: identification information of a radio bearer, indication information for DAPS configuration and first indication information for data transmission.

In the method according to the embodiment of the present disclosure, the information of DAPS radio bearers may include at least one of the following information: identification information of radio bearers and second indication information for data transmission.

In the method according to the embodiment of the present disclosure, the information of non-DAPS radio bearers may include at least one of the following information: identification information of radio bearers and third indication information for data transmission.

According to another aspect of the present disclosure, there is provided a method performed by a first node in a wireless communication system. The method includes: during the handover procedure, generating a request message including information related to data transmission for one or more radio bearers; and transmitting, to a second node, the request message, wherein the first node is a node b central unit and the second node is a node b distributed unit.

According to another aspect of the present disclosure, there is provided a method performed by a second node in a wireless communication system. The method includes: during the handover procedure, receiving, from a first node, a request message including information related to data transmission for one or more radio bearers; and determining the data transmission based on the request message, wherein the first node is a node b central unit and the second node is a node b distributed unit.

In the method according to the embodiment of the present disclosure, the information related to the data transmission for the one or more radio bearers includes one or more data radio bearers (DRBs) identifications (IDs).

In the method according to the embodiment of the present disclosure, the information related to the data transmission for the one or more radio bearers further includes indication information for the data transmission.

In the method according to the embodiment of the present disclosure, the indication information for the data transmission indicates to stop the data transmission for the one or more radio bearers not subject to a handover.

In the method according to the embodiment of the present disclosure, the first node and the second node are included in a source base station.

According to another aspect of the present disclosure, there is provided a first node in a wireless communication system. The first node includes: memory; a transceiver; and at least one processor connected to the memory and the transceiver, wherein the at least one processor is configured to: during the handover procedure, generate a request message including information related to data transmission for one or more radio bearers; and control the transceiver to transmit, to a second node, the request message, wherein the first node is a node b central unit and the second node is a node b distributed unit.

According to another aspect of the present disclosure, there is provided a second node in a wireless communication system. The second node includes: a memory; a transceiver; and at least one processor connected to the memory and the transceiver, wherein the at least one processor is configured to: during the handover procedure, control the transceiver to receive, from a first node, a request message including information related to data transmission for one or more radio bearers; and determine the data transmission based on the request message, wherein the first node is a node b central unit and the second node is a node b distributed unit.

According to another aspect of the present disclosure, there is provided an electronic device including: a memory for storing a computer program; and a controller configured to execute the computer program to implement the method according to the present disclosure. The electronic device may be a node or a user equipment.

BRIEF DESCRIPTION OF DRAWINGS

For a more complete understanding of the present disclosure and its advantages, reference is now made to the following description taken in conjunction with the accompanying drawings, in which like reference numerals represent like parts.

MODE FOR THE INVENTION

The exemplary embodiments of the present disclosure will be further described below with reference to the accompanying drawings.

The text and drawings are provided as examples only to help understanding of the present disclosure. They should not be construed as limiting the scope of the present disclosure in any way. Although certain embodiments and examples have been provided, based on the content disclosed herein, it is obvious to those skilled in the art that the embodiments and examples shown can be changed without departing from the scope of the present disclosure.

FIGS. 1 to 10 discussed below and various embodiments for describing the principles of the present disclosure in this patent document are for illustration only, and should not be construed as limiting the scope of the present disclosure in any way. Those skilled in the art will understand that the principle of the present disclosure may be implemented in any suitably arranged systems or devices.

Figure 1:
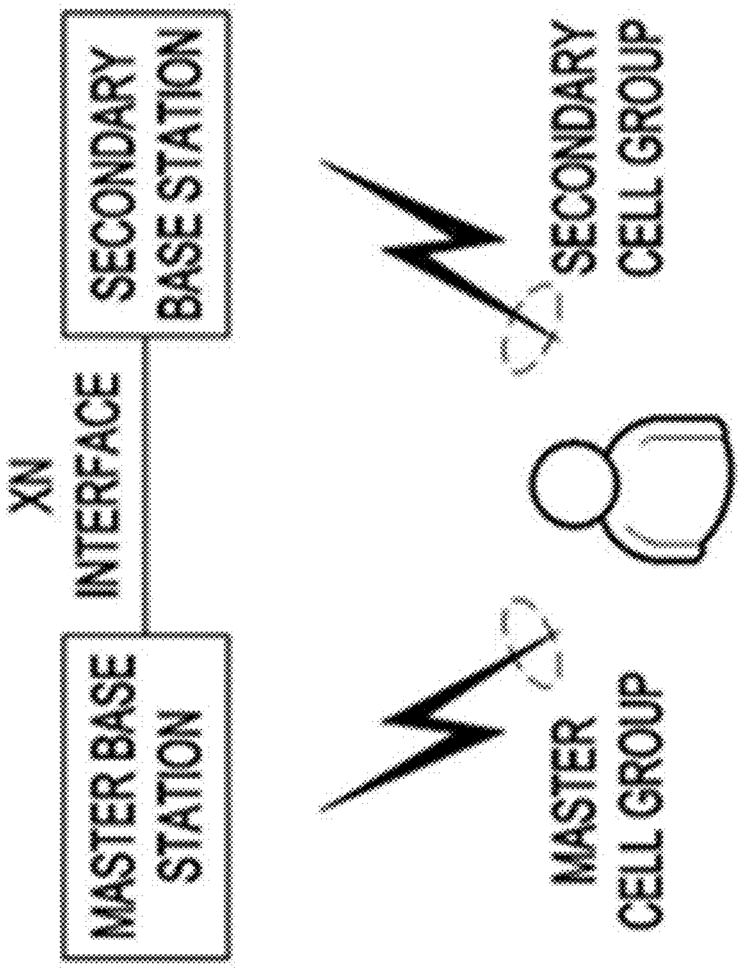
FIG. 1 is an exemplary diagram of dual-connectivity (DC) technology.

In the Long Term Evolution (LTE) and New Radio NR (New Radio) access networks, in order to increase the throughput of user equipments, the 3rd Generation Partnership Project (3GPP) has designed a dual-connectivity (DC) technology, as shown in FIG. 1, that is, one user equipment may maintain connectivity with two base stations (a master base station and a secondary base station) at the same time, and thereby the user equipment may perform data transmission with the two base stations (the master base station and the secondary base station) simultaneously. A cell group in which the master base station provides services to user equipments is the Master cell group (MCG), and a cell group in which the secondary base station provides services to user equipments is the secondary cell group (SCG), each cell group comprises one or more cells. The master base station and the secondary base station are connected through an Xn interface. For the NR network, although the dual-connectivity technology improves the throughput of user equipments, it also brings about some problems. For example, in the NR network, the user equipment may establish the dual-connectivity within the two frequency ranges of FR1 (frequency range 1) and FR2 (frequency range 2), and furthermore, user equipment may establish the dual-connectivity within the mmWAVE (millimeter wave) range. Under general circumstances, the frequency range for serving SCG is FR2 (Frequency Range 2) or mmWAVE. As the frequency range increases, the power consumption of a user equipment will increase, especially when the user equipment operates in the FR2 and mmWave range, the power consumption of the user equipment will increase greatly.

In addition, in order to avoid interruption of data transmission of the user equipment during a handover process, 3GPP has proposed a dual active protocol stack handover mechanism (a DAPS handover: Dual Active Protocol Stack handover). In this handover mechanism, during the handover process, the user equipment may maintain communication with a source base station until the network side notifies the user equipment to release the communication with the source base station. During the DAPS handover process, in the conventional technology, the network side either maintains all data transmission with the user equipment or stops all data transmission with the user equipment. However, in some cases, the user equipment does not need to maintain all data transmission with the source base station, but only maintains partial data transmission, which helps to save the resources of the source base station, and ensures that partial data transmission is not interrupted during the handover process.

A problem to be solved by the present disclosure is how to reduce the power consumption of a user equipment after the user equipment has established a dual-connectivity. In the conventional technology, the user equipment may be configured with Discontinuous Reception (DRX) on the SCG, so that the user equipment may periodically start the detection of resource scheduling (such as detection of physical downlink control channels (PDCCHs)). If no data is scheduled for a certain period of time, then the user equipment may sleep for a period of time, thereby power of the user equipment may be saved. However, the problem with this method is that the user equipment still needs to start detections of resource scheduling every certain period of time, and this type of detections will result in considerable power consumption by the user equipment. When there is no user data needed to be transmitted, the user equipment still consumes power. Therefore, the present disclosure intends to further reduce the power consumption of the user equipment, that is, when a user equipment has no data transmission for a period of time, it may be considered to deactivate the SCG of the user equipment, thereby further reduce the power consumption of the user equipment.

Another problem to be solved by the present disclosure is how to control the transmission of user data when the user equipment performs a DAPS handover, so as to ensure that partial data transmission is not interrupted during the handover process.

In general, the present disclosure includes three aspects:

Configuration, detection and notification regarding SCG activation/deactivation on the network side (master base station and secondary base station side)

Figure 2:
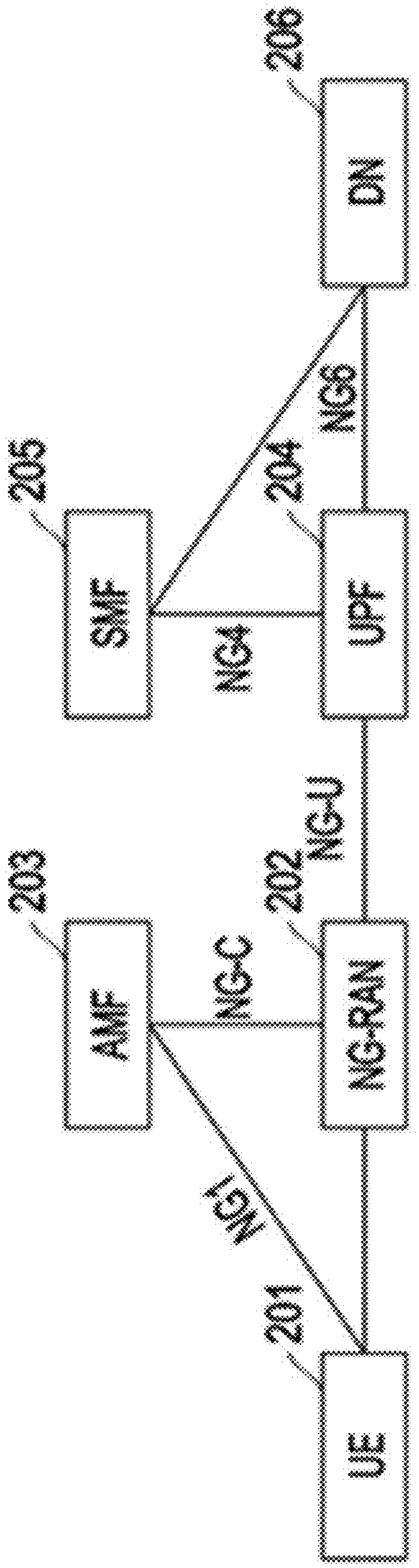
FIG. 2 is an exemplary system architecture 200 according to various embodiments of the present disclosure.

Configuration, detection and notification regarding SCG activation/deactivation on the user equipment side Control of data transmission during a user handover process FIG. 2 is an exemplary system architecture 200 according to various embodiments of the present disclosure. Other embodiments of the system architecture 200 may be used without departing from the scope of this disclosure.

User equipment (UE) 201 is a terminal device for receiving data. Next generation radio access network (NG-RAN) 202 is a radio access network, which includes a base station (a gNB or an eNB connected to 5G core network 5GC, the eNB connected to is also called a ng-eNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity (SMF) 205 is responsible for session management. A data network (DN) 206 includes for example, services of operators, access of Internet, and services of third-parties, etc.

Figure 3:
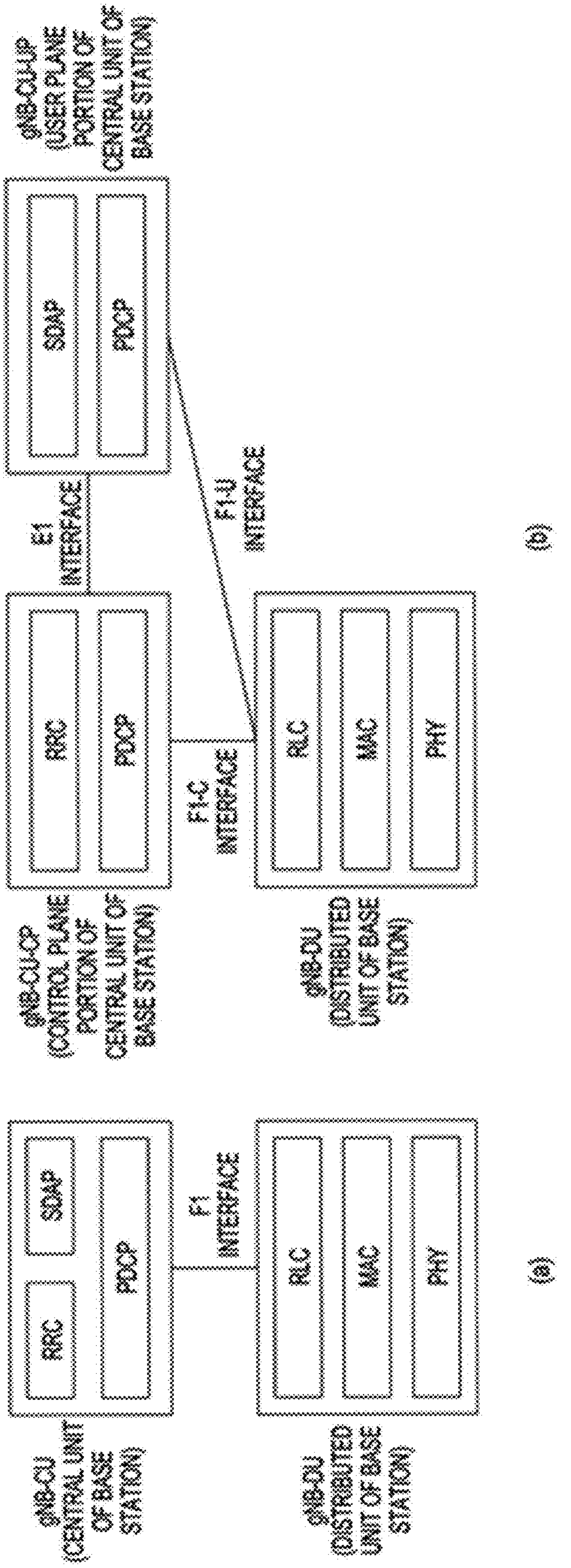
FIG. 3 is an example of structure of a base station according to an exemplary embodiment of the present disclosure.

In the NR system, in order to support network functions virtualization, more efficient resource management and scheduling, the base station (gNB) that provides the radio network interface with the user equipment (UE) may be further divided into a gNB central unit (gNB-CU) and a gNB distributed unit (gNB-DU) (referred to as a CU and a DU in the present disclosure), as shown in FIG. 3(*a*). The CU has Radio Resource Control (RRC), Service Data Adaptation Protocol (SDAP) and Packet Data Convergence Protocol (PDCP) layers, etc. The DU has Radio Link Control (RLC) protocol, Media Access Control (MAC), and Physical Layer (PHY), etc. There is a standardized public interface F1 between the CU and DU. The F1 interface is divided into a F1-C interface of a control plane portion and a F1-U interface of a user plane portion. The transmission network layer of the F1-C interface is transmitted based on the Internet Protocol (IP). In order to more reliably transmit signaling, a Stream Control Transmission Protocol (SCTP) is added on the top of IP. The protocol of the application layer is F1AP, see 3GPP TS38.473. The SCTP may provide reliable transmission of an application layer message. The transmission layer of the F1-U interface is User Datagram Protocol (UDP)/IP, a General Packet Radio Service (GPRS) tunnel protocol GTP (GPRSTunnelProtocol)-U is used to carry the Protocol Data Units (PDUs) of user plane on top of the UDP/IP. Further, as shown in FIG. 3(*b*), the gNB-CU may include a gNB-CU-CP (a control plane portion of a central unit of a base station) and a gNB-CU-UP (a user plane portion of the central unit of the base station), the gNB-CU-CP includes the functions of the control plane of the base station with RRC and PDCP protocol layers, and the gNB-CU-UP includes the functions of the user plane of the base station with SDAP and PDCP protocol layers. There is a standardized public interface E1 between the gNB-CU-CP and gNB-CU-UP, and the protocol used is E1AP, see 3GPP TS38.463. The interface between the control plane portion of the central unit of the base station and the distributed unit of the base station is the F1-C interface, that is, the control plane interface of F1, and the interface between the user plane portion of the central unit of the base station and the distributed unit of the base station is the F1-U interface, that is, the user plane interface of F1.

The message names involved in the present disclosure are only examples, and other message names may also be used.

The "first", "second", etc. included in the message names and/or entity names of the present disclosure are only examples of messages and/or entities, are only used to distinguish one message and/or entity from another message and/or entity, and are irrelevant to the execution order.

In the present disclosure, detailed descriptions of steps irrelevant to the present disclosure are omitted.

Figure 4:
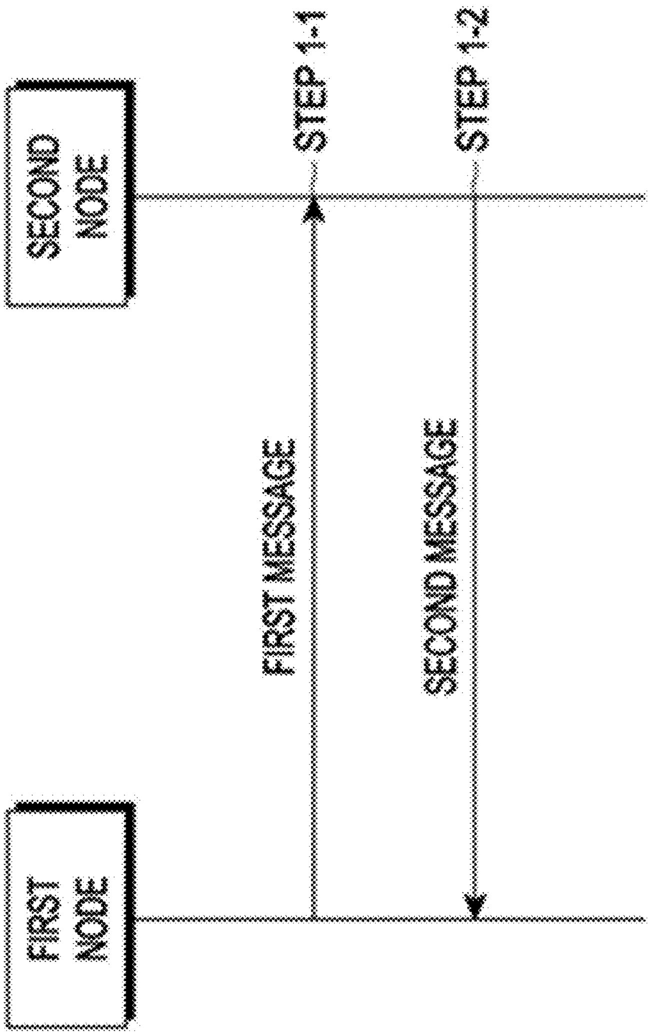
FIG. 4 is a flowchart of configurations regarding notification of SCG status, activation/deactivation of SCG, and detection of SCG status on the network side, according to an exemplary embodiment of the present disclosure.

The present disclosure involves the following exemplary procedures:

Exemplary Procedure 1: Configurations Regarding Notification of SCG Status, SCG Activation/Deactivation, and SCG Status Detection on Network Side The procedure may include the following steps, as shown in FIG. 4.

Step 1-1: A first node transmits a first message to a second node. The first message includes configuration information related to SCG activation/deactivation, such as configurations of activation/deactivation of SCG, SCG status detection and/or SCG status notification. In one implementation, the first message may be a first configuration request message, which includes at least one of the following information:

■ Configuration information related to data transmission, the function of which is to configure data transmission, wherein the data may be downlink data, or may be uplink data, or may be uplink and downlink data. The configuration information may be applicable to one or more types of data, and for one type of the data, the configuration information includes at least one of the following information:

▶ First threshold information, which indicates a threshold for enabling SCG to transmit data. In one implementation, in particular, when data volume of a user equipment is greater than the threshold, SCG may be enabled to transmit data; or when the data volume of a user equipment is less than the threshold, SCG may not be enabled to transmit data.

▶ First time length information, which indicates the time length used to conduct statistics on the data volume of the user equipment. In one embodiment, if the data volume within the time indicated by the time length information exceeds the above first threshold information, SCG may be enabled to transmit data. In another embodiment, if the data volume within the time indicated by the time length information is less than the above first threshold information, SCG may not be enabled to transmit data.

▶ First applicable information, which indicates the data to which the above "first threshold information" and/or "first time length information" is applicable, including at least one of the following information:

Identification information of a user equipment, which indicates the identification of the user equipment to which the data belongs. If this information is included, it means that the above "first threshold information" and/or "first time length information" are user-level information.

Identification information of a PDU session, which indicates the identification of the PDU session to which the data belongs. If this information is included, it means that the above "first threshold information" and/or "first time length information" are PDU session-level information.

Identification information of a QoS flow, which indicates the identification of the QoS flow to which the data belongs. If this information is included, it means that the above "first threshold information" and/or "first time length information" are QoS flow-level information.

Identification information of a Data Radio Bearer (DRB), which indicates the identification of the DRB to which the data belongs. If this information is included, it means that the above "first threshold information" and/or "first time length information" are DRB s-level information.

In one embodiment, if the above "first applicable information" is not included in the configuration information related to data transmission, the above "first threshold information" and/or "first time length information" are user-level information, which are applicable to the data for one user equipment.

■ Information related to activity status detection time, which is used to indicate the time length for detecting the activity status of the node/SCG, includes at least one of the following information:

▶ Second time length information, which indicates the time length required to detect the activity status of the node/SCG.

▶ Second applicable information, which indicates the data to which the above "second time length information" is applicable, and the information includes at least one of the following information:

Identification information of a user equipment, which indicates the identification of the user equipment to which the data belongs. If this information is included, it means that the above "second time length information" is user-level information.

Identification information of a PDU session, which indicates the identification of the PDU session to which the data belongs. If this information is included, it means that the above "second time length information" is PDU session-level information.

Identification information of a QoS flow, which indicates the identification of the QoS flow to which the data belongs. If this information is included, it means that the above "second time length information" is QoS flow-level information.

Identification information of a DRB, which indicates the identification of the DRB to which the data belongs. If this information is included, it means that the above "second time length information" is DRB-level information.

In one embodiment, if the above "second applicable information" is not included in the information related to activity status detection time, the above "second time length information" is user-level information, and is applicable to the data for one user equipment.

■ Information related to activity status detection result, this information may be used to indicate whether there is data transmission on a node (the node may be the above first node or may be other nodes), and may also be used to indicate whether there is data transmission on a SCG. The data may be downlink data, or may be uplink data, or may be uplink and downlink data The information may be applicable to one or more types of data, and for one type of the data, the information includes at least one of the following information:

▶ Activity status indication information, for example, a node is in an inactive status, a node is in an active status, a SCG is in an inactive status (SCG inactivity), and a SCG is in an active status (SCG activity). For the node/SCG in an inactive status, in one embodiment, it indicates that there is no data transmission on the node/SCG; in another embodiment, it indicates that there is no data transmission on the node/SCG within a certain period of time (the certain period of time may be referred to "third time length information" described below); in yet another embodiment, it indicates that one node (the node may be the first node or may be other nodes, such as other nodes connected to the first node that are different from the second node) does not have data that requires to be transmitted by the SCG; in yet another embodiment, it indicates that one node (the node may be the first node or may be other nodes, such as other nodes connected to the first node that are different from the second node) does not have data that requires to be transmitted by the SCG within a certain period of time (the certain period of time may be referred to the "third time length information" described below). For the node/SCG in an active status, in one embodiment, it indicates that there is data transmission on the node/SCG; in another embodiment, it indicates that there is data transmission on the node/SCG within a certain period of time (the certain period of time may be referred to the "third time length information" described below); in yet another embodiment, it indicates that one node (the node may be the first node or may be other nodes, such as other nodes connected to the first node that are different from the second node) have data that requires to be transmitted by the SCG; in yet another embodiment, it indicates that one node (the node may be the first node or may be other nodes, such as other nodes connected to the first node that are different from the second node) have data that requires to be transmitted by the SCG within a certain period of time (the certain period of time may be referred to the "third time length information" described below).

▶ Third time length information, which indicates the time length used to detect the activity status of the node/SCG when the above "activity status indication information" is obtained, or the time length indicated by the information is the time length during which there is data required to be transmitted by the SCG or during which there is no data required to be transmitted by the SCG. In one embodiment, if there is no data required to be transmitted on the node/SCG within the time indicated by the time length information, the node/SCG may be considered in an inactive status, otherwise the node/SCG may be considered to be in an active status.

▶ Third applicable information, which indicates the data to which the above "activity status indication information" and/or "third time length information" are applicable, includes at least one of the following information:

Identification information of a user equipment, which indicates the identification of the user equipment to which the data belongs. If this information is included, it means that the above "activity status indication information" and/or "third time length information" are user-level information.

Identification information of a PDU session, which indicates the identification of the PDU session to which the data belongs. If this information is included, it means that the above "activity status indication information" and/or "third time length information" are PDU session-level information.

Identification information of a QoS flow, which indicates the identification of the QoS flow to which the data belongs. If this information is included, it means that the above "activity status indication information" and/or "third time length information" are QoS flow-level information.

Identification information of a DRB, which indicates the identification of the DRB to which the data belongs. If this information is included, it means that the above "activity status indication information" and/or "third time length information" are DRB-level information.

In one embodiment, if the above "third applicable information" is not included in the information related to activity status detection result, the above "activity status indication information" and/or "third time length information" are user-level information, and are applicable to the data for one user equipment.

■ Indication information for data transmission, the function of which is to notify whether there is data required to be transmitted by SCG. In one embodiment, the information is generated when new data required to be transmitted by SCG arrives; in another embodiment, the information is generated when there is data required to be transmitted by SCG, the information includes at least one of the following information:

▶ Indication information for data arrival, which indicates whether data required to be transmitted by SCG arrives or whether there is data required to be transmitted by SCG.

▶ Fourth applicable information, which indicates the data to which the above "indication information for data arrival" is applicable, includes at least one of the following information:

Identification information of a user equipment, which indicates the identification of the user equipment to which the data belongs. If this information is included, it means that the above "indication information for data arrival" is user-level information.

Identification information of a PDU session, which indicates the identification of the PDU session to which the data belongs. If this information is included, it means that the above "indication information for data arrival" is PDU session-level information.

Identification information of a QoS flow, which indicates the identification of the QoS flow to which the data belongs. If this information is included, it means that the above "indication information for data arrival" is QoS flow-level information.

Identification information of a DRB, which indicates the identification of the DRB to which the data belongs. If this information is included, it means that the above "indication information for data arrival" is DRB-level information.

In one embodiment, if the above "fourth applicable information" is not included in the indication information for data transmission, the above "indication information for data arrival" is user-level information, and is applicable to the data for one user equipment.

■ Control information related to activity status, the function of which is to control the activation or deactivation of the SCG, such as activating the SCG, deactivating the SCG. In one embodiment, after receiving the information, the second node will configure the user equipment according to the information, and will also decide whether to transmit data on the SCG.

■ Notification information related to activity status, the function of which is to notify the receiving node of the information about the status of the SCG/node, such as the activated status and the deactivated status. In one embodiment, after receiving the information, the second node will determine whether to transmit data to the SCG/other nodes (the nodes serving SCG). In particular, if a SCG is in the activated status, the second node may transmit data to the SCG/other nodes (the nodes serving the SCG), and if a SCG is in the deactivated status, the second node will not transmit data to the SCG/other nodes (the nodes serving the SCG); in another embodiment, the second node will configure other nodes (the nodes serving the SCG) after receiving the information.

Step 1-2: Optionally, the second node transmits a second message to the first node. In one implementation, the second message may be a first response message, and the first response message may be a response message or an acknowledge message to the first message. In one implementation, the first response message may be a first configuration response message. Further, the second message may also include configuration information of the SCG, the function of which is to configure the SCG (such as the indication information for activating the SCG, the indication information for deactivating the SCG).

In the above example procedure shown in FIG. 4, possible combinations of the first node and the second node may be one possible type of the following:

■ The first node is a master node (or a central unit of the master node, or a control plane portion of the central unit of the master node) (in the present disclosure, the terms "master node" and "master base station" may be used interchangeably), and the second node is a secondary node (or a central unit of the secondary node, or a control plane portion of the central unit of the secondary node) (in the present disclosure, the terms "secondary node" and "secondary base station" may be used interchangeably), the above "first configuration request message" and "first configuration response message" may be XnAP messages, or may be Xn-U messages, or may be other types of messages. In one example, the above "first configuration request message" and "first configuration response message" may be a secondary node addition/modification request (S-Node Addition/Modification Request) message and a secondary node addition/modification request acknowledge (S-Node Addition/Modification Request Acknowledge) message, respectively. In another example, the above "first configuration request message" may be an activity notification (Activity Notification) message.

■ The first node is a secondary node (or a central unit of the secondary node, or a control plane portion of the central unit of the secondary node), and the second node is a master node (or a central unit of the master node, or a control plane portion of the central unit of the master node), the above "first configuration request message" and "first configuration response message" may be XnAP messages, or may be Xn-U messages, or may be other types of messages. In one example, the above "first configuration request message" and "first configuration response message" may be a secondary node modification required (S-Node Modification Required) message and a secondary node modification confirm (S-Node Modification Confirm) message, respectively. In another example, the above "first configuration request message" may be an activity notification (Activity Notification) message.

■ The first node is a control plane portion of a central unit of a base station, and the second node is a user plane portion of the central unit of the base station. In the case of dual connectivity, the base station may be a master base station or may be a secondary base station. The above "first configuration request message" and "first configuration response message" may be E1AP messages or may be other types of messages. In one example, the above "first configuration request message" and "first configuration response message" may be a bearer context setup/modification request (Bearer Context Setup/Modification Request) message and a bearer context setup/modification response (Bearer Context Setup/Modification Request) message, respectively.

■ The first node is a user plane portion of a central unit of a base station, and the second node is a control plane portion of the central unit of the base station. In the case of dual connectivity, the base station may be a master base station or may be a secondary base station. The above "first configuration request message" and "first configuration response message" may be E1AP messages or may be other types of messages. In one example, the above "first configuration request message" and "first configuration response message" may be the bearer context modification required (Bearer Context Modification Required) message and the bearer context modification confirm (Bearer Context Modification Confirm) message, respectively. In another example, the above "first configuration request message" may be a bearer context inactivity notification (Bearer Context Inactivity Notification) message or a downlink data notification (DL Data Notification) message.

■ The first node is a central unit of a base station or a control plane portion of the central unit of the base station, and the second node is a distributed unit of the base station. In the case of dual connectivity, the base station may be a master base station or may be a secondary base station. The above "first configuration request message" and "first configuration response message" may be F1AP messages, or may be F1-U messages, or may be other types of messages. In one example, the above "first configuration request message" and "first configuration response message" may be a user equipment context setup/modification request (UE Context Setup/Modification Request) message and a user equipment context setup/modification response (UE Context Setup/Modification Response) message, respectively.

- The first node is a distributed unit of a base station, and the second node is a central unit of the base station or a control plane portion of the central unit of the base station. In the case of dual connectivity, the base station may be a master base station or may be a secondary base station. The above "first configuration request message" and "first configuration response message" may be F1AP messages, or may be F1-U messages, or may be other types of messages. In one example, the above "first configuration request message" and "first configuration response message" may be a user equipment context modification required (UE Context Modification Required) message and a user equipment context modification confirm (UE Context Modification Confirm) message, respectively. In another example, the above "first configuration request message" may be a user equipment inactivity notification (UE Inactivity Notification) message.
- The first node is a distributed unit of a base station, and the second node is a user plane portion of a central unit of the base station. In the case of dual connectivity, the base station may be a master base station or may be a secondary base station. The above "first configuration request message" may be an F1-U message, such as downlink data delivery status (DL Data Delivery Status), or other types of messages.
- The first node is a user plane portion of a central unit of a base station, and the second node is a distributed unit of the base station. In the case of dual connectivity, the base station may be a master base station or may be a secondary base station. The above "first configuration request message" may be an F1-U message, such as downlink user data (DL User Data), or other types of messages.

Although the names of related messages are given in conjunction with the types of nodes, those skilled in the art should understand that the above names of messages are only examples, and other names of messages may be used without departing from the scope of the present disclosure.

For the convenience of understanding, according to the above example procedure 1, the present disclosure further includes the following possible embodiments.

Embodiment 1: The activity status of the SCG is detected by a distributed unit of a base station. The activity status of the SCG is determined by a central unit of the base station or a control plane portion of the central unit of the base station. In one embodiment, the base station may be a secondary base station.

Figure 5:
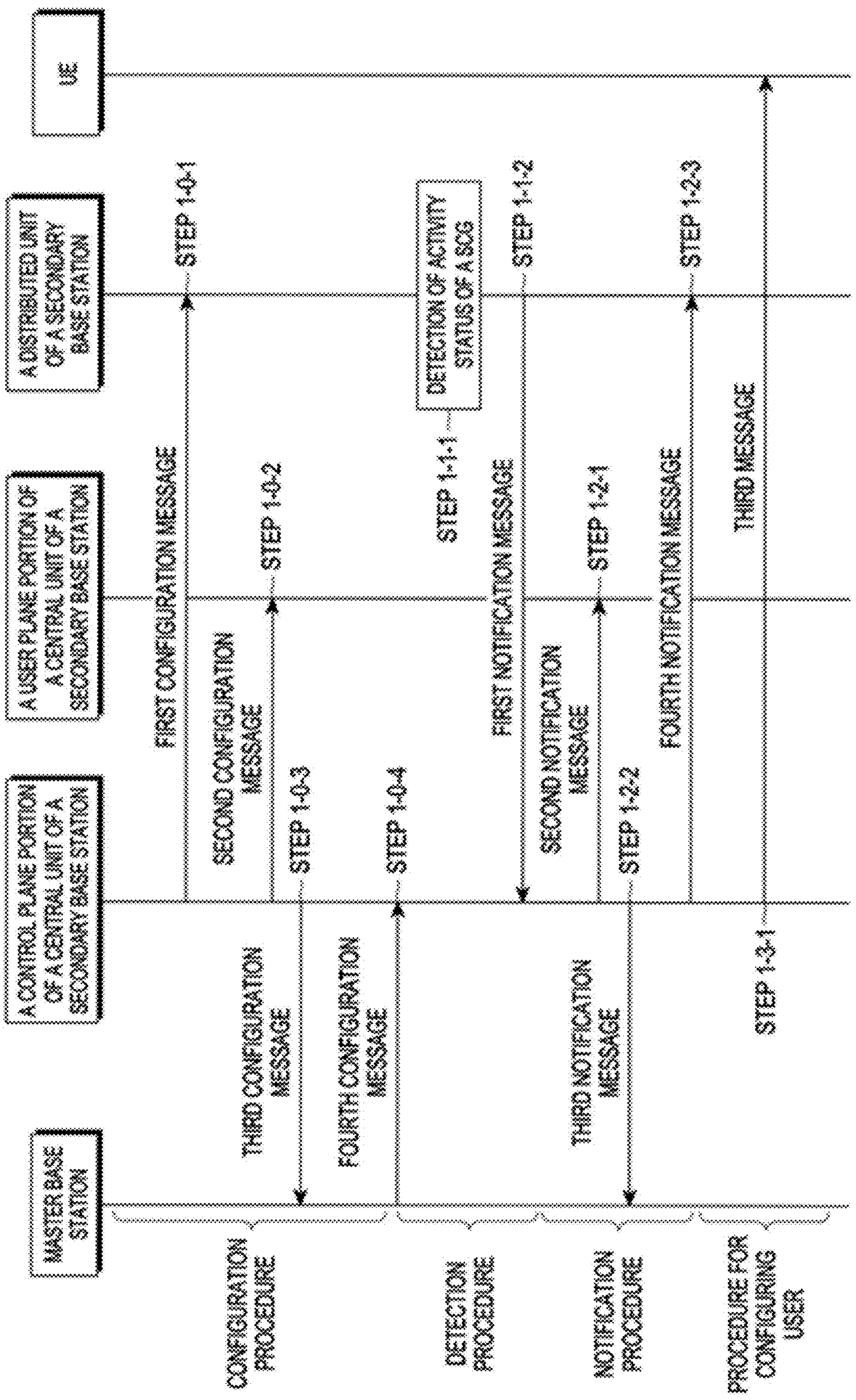
FIG. 5 is a flowchart of configurations regarding notification of SCG status, activation/deactivation of SCG, and detection of SCG status, according to a first embodiment of the present disclosure.

As shown in FIG. 5, the embodiment 1 may include the following procedures:

Detection procedure, which is used to detect the activity status of SCG/node, including:

Step 1-1-1: A distributed unit of a base station detects the activity status of a SCG, or detects its own activity status.

Step 1-1-2: The distributed unit of the base station transmits the first notification message to a central unit of the base station (or a control plane portion of the central unit of the base station). The function of this message is to notify the activity status of the SCG or the distributed unit. This message includes at least one of the following information:

Information related to activity status detection results

Indication information for data transmission

The above information may be the information included in the "first configuration request message" described with reference to FIG. 4.

Notification procedure, the function of which is to notify the activity status of the SCG/node, may include the following steps (whether each step is executed or not is not restricted, and the execution order of various steps is not restricted):

Step 1-2-1: The control plane portion of the central unit of the base station transmits a second notification message to a user plane portion of the central unit of the base station. The function of this message is to notify the status of the SCG/node, which includes at least one of the following information:

Notification information related to activity status

Control information related to activity status

The above information may be the information included in the "first configuration request message" described with reference to FIG. 4.

Step 1-2-2: When the base station is a secondary base station, the procedure further includes transmitting a third notification message to a master base station (or a central unit of the master base station, or a control plane portion of the central unit of the master base station) by the central unit of the base station (or the control plane portion of the central unit of the base station), the function of the message is to notify the status of the node/SCG. This message includes at least one of the following information:

Notification information related to activity status

Control information related to activity status

The above information may be the information included in the "first configuration request message" described with reference to FIG. 4.

Step 1-2-3: The central unit of the base station (or the control plane portion of the central unit of the base station) transmits a fourth notification message to the distributed unit of the base station. The function of this message is to notify the status of the SCG/node. This message includes at least one of the following information:

Notification information related to activity status

Control information related to activity status

The above information may be the information included in the "first configuration request message" described with reference to FIG. 4.

Procedure for configuring user, the function of which is to configure the data transmission of the user on the SCG, may include the following steps:

Steps: 1-3-1: Optionally, the base station (or the central unit of the base station or the control plane portion of the central unit of the base station) transmits a third message to user equipment, which includes information related to configuration of the data transmission of the user equipment on the SCG. In one implementation, the third message may be a first user configuration message, the function of which is to configure the user equipment to activate or deactivate the SCG. According to the configuration message, the user equipment may determine whether to continue data transmission on the SCG. The configuration message may be a RRC message, or may be indication information of a MAC layer, or may be other types of indication information. The first user configuration message includes at least one of the following information:

Control information related to activity status

The above information may be the information included in the "first configuration request message" described with reference to FIG. 4.

Configuration procedure, the function of which is to configure the detection of the activity status, or to configure the transmission of user data. The activity status may be the activity status of a node or may be the activity status of a SCG; the transmission of the user data may be the transmission of user data on the node, or may be the transmission of the user data served by the SCG. The procedure occurs before or after the above "detection procedure", or overlaps with the "detection procedure". This procedure may include the following steps (whether each step is executed or not is not restricted, and the execution order of various steps is not restricted):

Step 1-0-1: The central unit of the base station (or the control plane portion of the central unit of the base station) transmits a first configuration message to the distributed unit of the base station. The function of this message is to configure the distributed unit of the base station to perform detection of SCG/node status and/or to configure the transmission of the user data. The message includes at least one of the following information:

Configuration information related to data transmission

Information related to activity status detection time

The above information may be the information included in the "first configuration request message" described with reference to FIG. 4.

Step 1-0-2: The control plane portion of the central unit of the base station transmits a second configuration message to the user plane portion of the central unit of the base station. The function of this message is to configure the user plane portion of the central unit of the base station to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

Step 1-0-3: The central unit of the base station (the base station is a secondary base station) (or the control plane portion of the central unit of the base station) transmits a third configuration message to the master base station (or the central unit of the master base station, or the control plane portion of the central unit of the master base station). The function of this message is to configure the master base station (or the central unit of the master base station, or the control plane portion of the central unit of the master base station) to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

Step 1-0-4: The master base station (or the central unit of the master base station, or the control plane portion of the central unit of the master base station) transmits a fourth configuration message to the central unit of the base station (the base station is a secondary base station) (or the control plane portion of the central unit of the base station). The function of this message is to configure the central unit of the base station (or the control plane portion of the central unit of the base station) to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

In one embodiment, after the above step 1-0-4, the above step 1-0-1 and step 1-0-2 may also be performed.

Embodiment 2: The activity status of a SCG is detected by a plurality of network entities respectively. The activity status of the SCG is determined by a central unit of a base station or a control plane portion of the central unit of the base station. In one embodiment, the base station is a secondary base station.

Figure 6A:
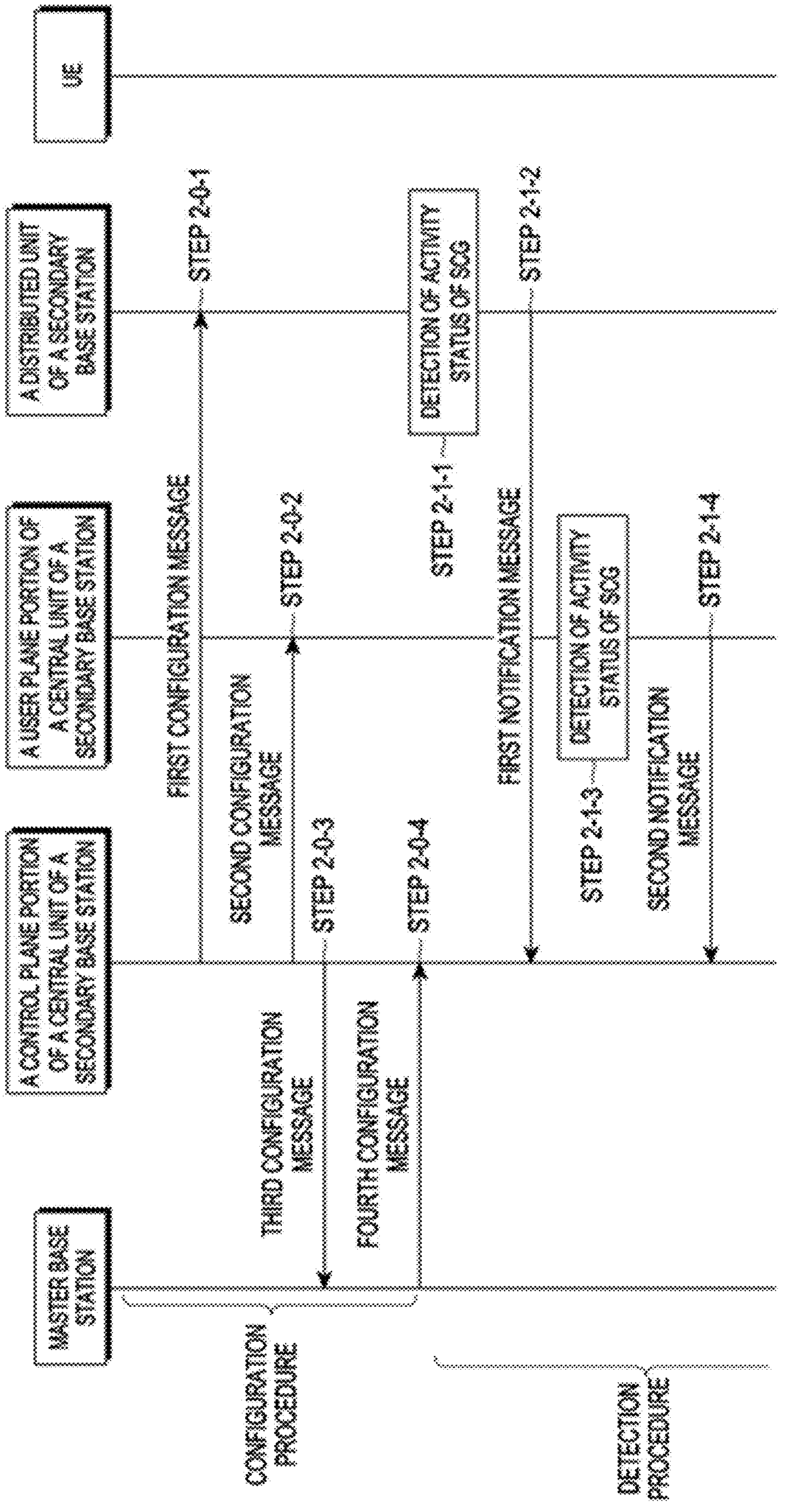
FIGS. 6*a* and 6*b* are a flowchart of configurations regarding notification of SCG status, activation/deactivation of SCG, and detection of SCG status, according to a second embodiment of the present disclosure.
Figure 6B:
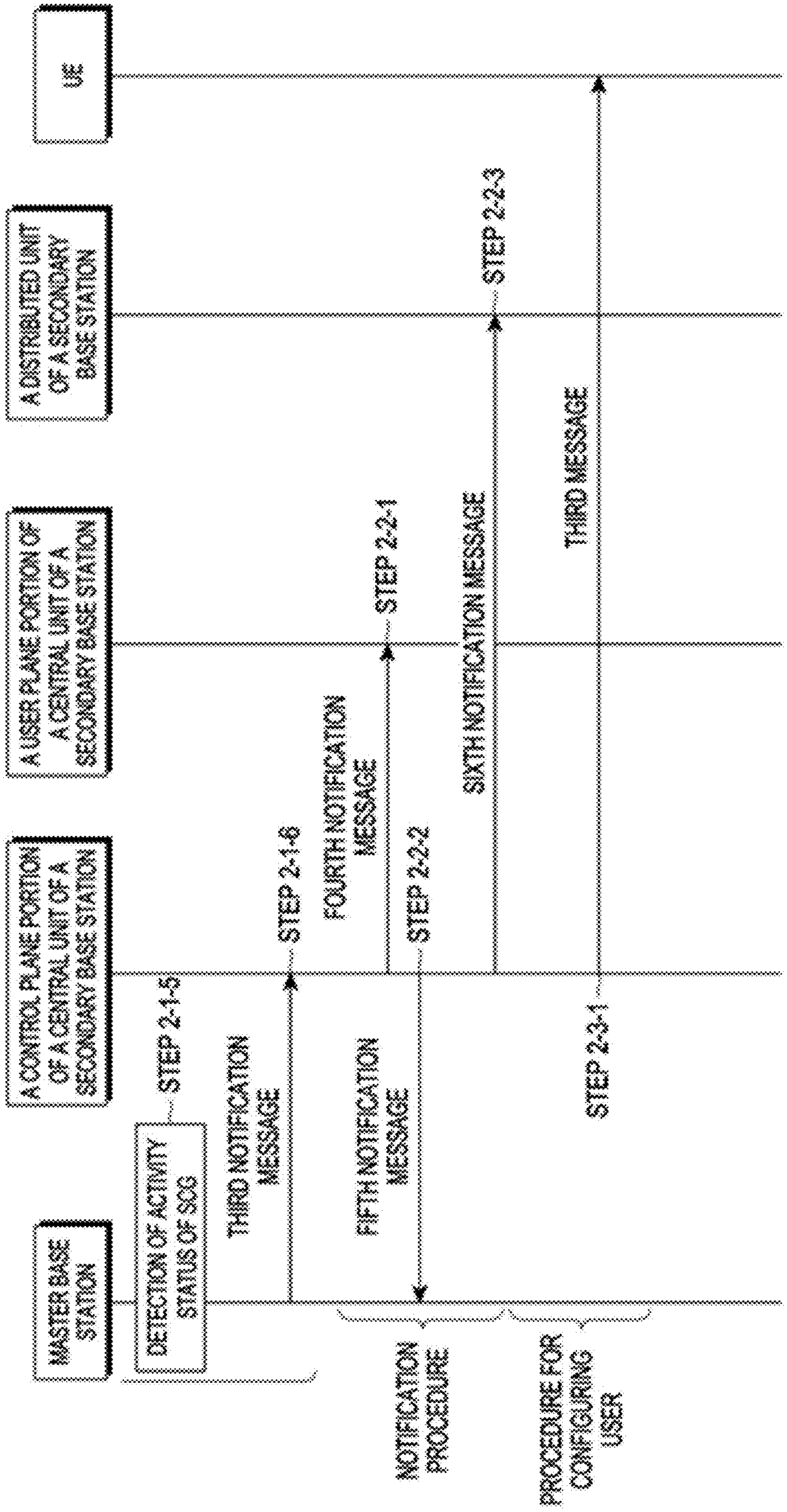

As shown in FIGS. 6*a* and 6*b*, the embodiment 2 may include the following procedures:

Detection procedure, which is used to detect the activity status of the SCG/node, may include the following steps (whether each step is executed or not is not restricted, and the execution order of various steps is not restricted):

Step 2-1-1: A distributed unit of a base station detects the activity status of the SCG, or detects its own activity status.

Step 2-1-2: The distributed unit of the base station transmits the first notification message to a central unit of the base station (or a control plane portion of the central unit of the base station). The function of this message is to notify the activity status of the SCG or the distributed unit. This message includes at least one of the following information:

Information related to activity status detection results

Indication information for data transmission

The above information may be the information included in the "first configuration request message" described with reference to FIG. 4.

Step 2-1-3: A user plane portion of the central unit of the base station detects the activity status of the SCG, or detects its own activity status.

Step 2-1-4: The user plane portion of the central unit of the base station transmits a second notification message to the control plane portion of the central unit of the base station. The function of this message is to notify the activity status of the SCG or the user plane portion of the central unit of the base station. This message includes at least one of the following information:

Information related to activity status detection results

Indication information for data transmission

The above information may be the information included in the "first configuration request message" described with reference to FIG. 4.

Step 2-1-5: A master base station (or a central unit of the master base station, or a distributed unit of the master base station, or a user plane portion of the central unit of the master base station) detects the activity status of the SCG, or detects its own activity status.

Step 2-1-6: The master base station (or the central unit of the master base station, or the distributed unit of the master base station, or the user plane portion of the central unit of the master base station) transmits the third notification message to the control plane portion of the central unit of the secondary base station. The function of this message is to notify the activity status of the SCG or the master base station. This message includes at least one of the following information:

Information related to activity status detection results

Indication information for data transmission

The above information may be the information included in the "first configuration request message" described with reference to FIG. 4.

According to the above step 2-1-2 and/or step 2-1-4 and/or step 2-1-6, the central unit of the base station or the control plane portion of the central unit of the base station may know the activity status of the SCG/node.

Notification procedure, the function of which is to notify the activity status of the SCG/node, may include the following steps (whether each step is executed or not is not restricted, and the execution order of various steps is not restricted):

Step 2-2-1: The control plane portion of the central unit of the base station transmits a fourth notification message to the user plane portion of the central unit of the base station. The function of this message is to notify the status of the SCG/node. This message includes at least one of the following information:

Notification information related to activity status

Control information related to activity status

The above information may be the information included in the "first configuration request message" described with reference to FIG. 4.

Step 2-2-2: When the base station is a secondary base station, the procedure further includes transmitting a fifth notification message to the master base station (or the central unit of the master base station, or the control plane portion of the central unit of the master base station) by the control plane of the central unit of the base station or the central unit of the base station, the function of the message is to notify the status of the SCG/node. This message includes at least one of the following information:

Notification information related to activity status

Control information related to activity status

The above information may be the information included in the "first configuration request message" described with reference to FIG. 4.

Step 2-2-3: The central unit of the base station (or the control plane portion of the central unit of the base station) transmits a sixth notification message to the distributed unit of the base station. The function of this message is to notify the status of the SCG/node. This message includes at least one of the following information:

Notification information related to activity status

Control information related to activity status

The above information may be the information included in the "first configuration request message" described with reference to FIG. 4.

Procedure for configuring user, the function of which is to configure the data transmission of the user on the SCG, may include the following steps:

Step 2-3-1: The master base station or the secondary base station transmits a third message to user equipment, which includes information related to configuration of the data transmission of the user equipment on the SCG. In one implementation, the third message may be a first user configuration message, the function of which is to configure the user equipment to activate or deactivate the a SCG. According to the configuration message, the user equipment may determine whether to continue the data transmission on the SCG. The configuration message may be a RRC message, or may be indication information of a MAC layer, or may be other types of indication information. The first user configuration message includes at least one of the following information:

Control information related to activity status

The above information may be the information included in the "first configuration request message" described with reference to FIG. 4.

Configuration procedure, the function of the process is to configure the detection of the activity status, or to configure the transmission of user data. The activity status may be the activity status of a node or the activity status of a SCG; the transmission of the user data may be the transmission of the user data on the node, may also be the transmission of user data served by the SCG. This procedure occurs before or after the above "detection procedure", or overlaps with the "detection procedure". This procedure may include the following steps (whether each step is executed or not is not restricted, and the execution order of various steps is not restricted):

Step 2-0-1: The central unit of the base station (or the control plane portion of the central unit of the base station) transmits a first configuration message to the distributed unit of the base station. The function of this message is to configure the distributed unit of the base station to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

Step 2-0-2: The control plane portion of the central unit of the base station transmits a second configuration message to the user plane portion of the central unit of the base station. The function of this message is to configure the user plane portion of the central unit of the base station to perform detection of SCG/node status and/or to configure the transmission of the user data, which includes at least one of the following information:

Configuration information related to data transmission

Information related to activity status detection time

The above information may be the information included in the "first configuration request message" described with reference to FIG. 4.

Step 2-0-3: The central unit of the base station (the base station is the secondary base station) (or the control plane portion of the central unit of the base station) transmits a third configuration message to the master base station (or the central unit of the master base station, or the control plane portion of the central unit of the master base station). The function of this message is to configure the master base station (or the central unit of the master base station, or the control plane portion of the central unit of the master base station) to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

Step 2-0-4: The master base station (or the central unit of the master base station, or the control plane portion of the central unit of the master base station) transmits a fourth configuration message to the central unit of the base station (the base station is a secondary base station) (or the control plane portion of the central unit of the base station). The function of this message is to configure the central unit of the base station (or the control plane portion of the central unit of the base station) to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

In one embodiment, after the above step 2-0-4, the above step 2-0-1 and step 2-0-2 may also be performed.

Embodiment 3: The activity status of a SCG is detected by a plurality of network entities respectively, and the activity status of the SCG is determined by a master base station (or a central unit of the master base station, or a control plane portion of the central unit of the master base station).

Figure 7A:
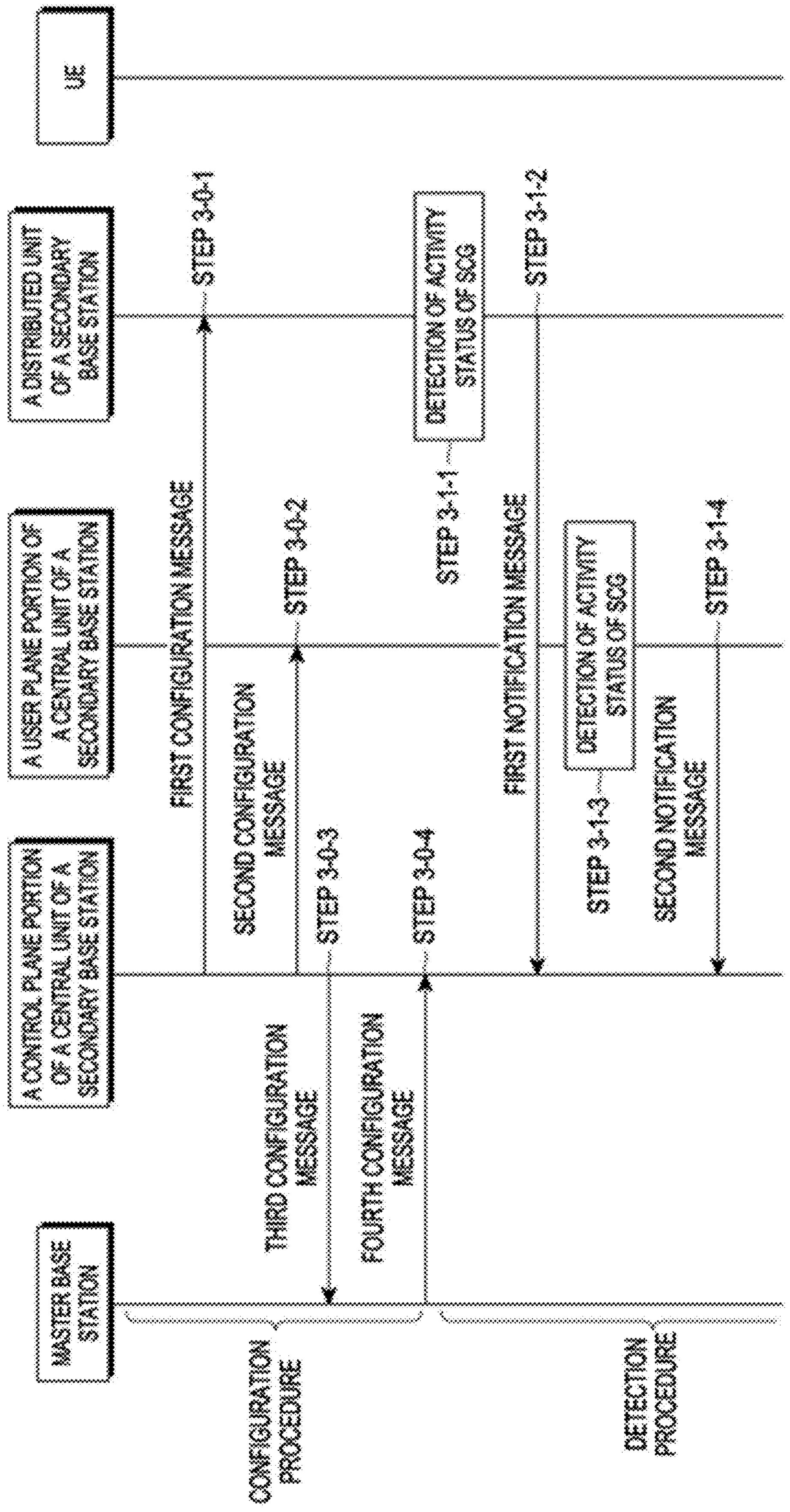
FIGS. 7*a* and 7*b* are a flowchart of configurations regarding notification of SCG status, activation/deactivation of SCG, and detection of SCG status, according to a third embodiment of the present disclosure.
Figure 7B:
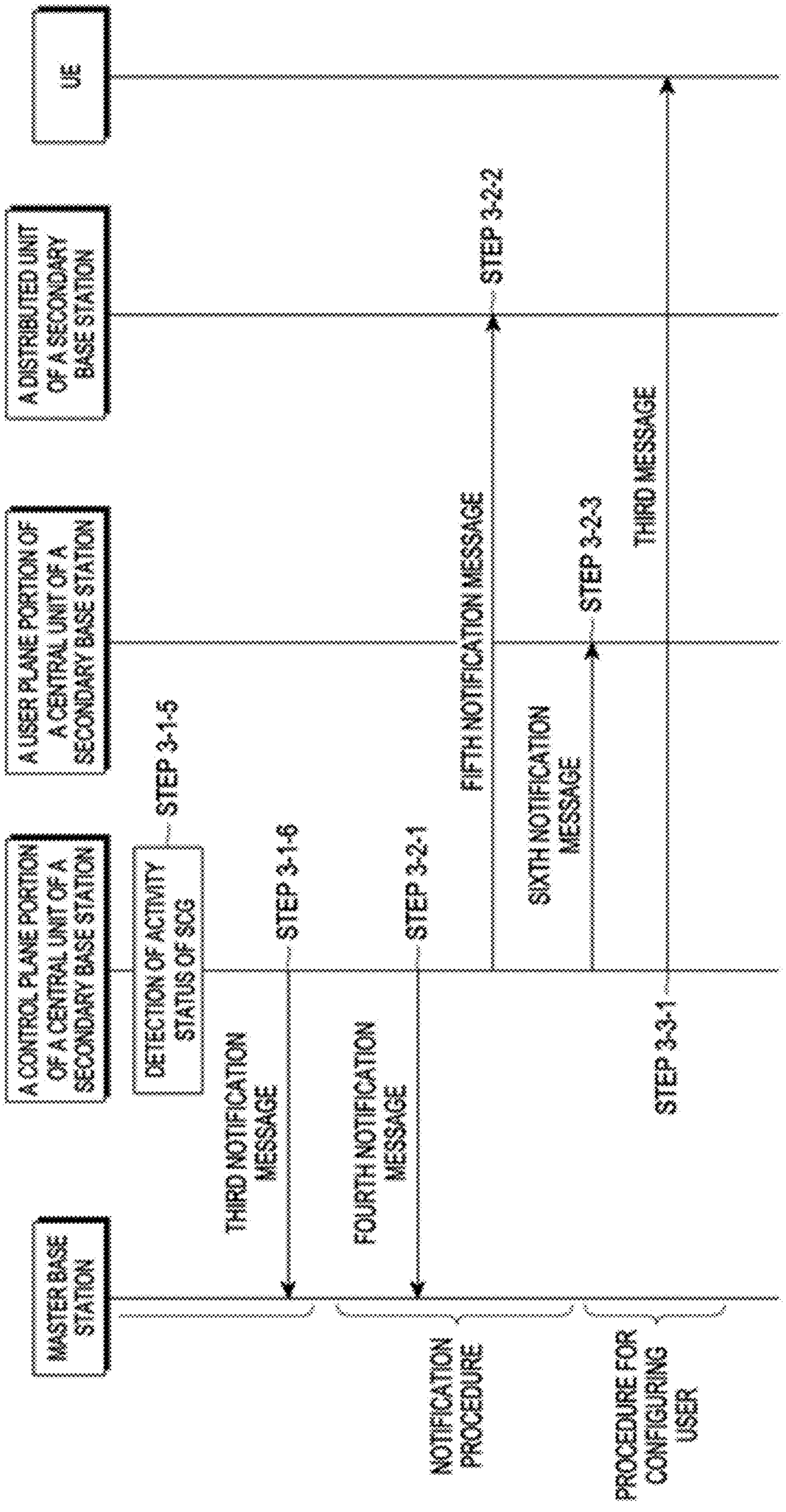

As shown in FIGS. 7*a* and 7*b*, the embodiment includes the following procedures:

Detection procedure, which is used to detect the activity status of a SCG/node, may include the following steps (whether each step is executed or not is not restricted, and the execution order of various steps is not restricted):

Step 3-1-1: A distributed unit of a base station detects the activity status of a SCG, or detects its own activity status.

Step 3-1-2: The distributed unit of the base station transmits a first notification message to a central unit of the base station (or a control plane portion of the central unit of the base station). The function of this message is to notify the activity status of the SCG or the activity status of the distributed unit. This message includes at least one of the following information:

Information related to activity status detection results

Indication information for data transmission

The above information may be the information included in the "first configuration request message" described with reference to FIG. 4.

Step 3-1-3: A user plane portion of the central unit of the base station detects the activity status of the SCG, or detects its own activity status.

Step 3-1-4: The user plane portion of the central unit of the base station transmits a second notification message to the control plane portion of the central unit of the base station. The function of this message is to notify the activity status of the SCG or the user plane portion of the central unit of the base station. This message includes at least one of the following information:

Information related to activity status detection results

Indication information for data transmission

The above information may be the information included in the "first configuration request message" described with reference to FIG. 4.

Step 3-1-5: The central unit of the base station (or the control plane portion of the central unit of the base station) detects the activity status of the SCG, or detects its own activity status. In one embodiment, in this step, the central unit of the base station (or the control plane portion of the central unit of the base station) detects the activity status of the SCG/node according to the information obtained in the above step 3-1-2 and/or step 3-1-4.

Step 3-1-6: The secondary base station (or the central unit of the base station, or the control plane portion of the central unit of the base station) transmits a third notification message to a master base station (or a central unit of the master base station, or a control plane portion of the central unit of the master base station). The function of this message is to notify the activity status of the SCG/node. This message includes at least one of the following information:

Information related to activity status detection results

Indication information for data transmission

The above information may be the information included in the "first configuration request message" described with reference to FIG. 4.

Notification procedure, the function of which is to notify the activity status of the SCG/node, may include the following steps (whether each step is executed or not is not restricted, and the execution order of various steps is not restricted):

Step 3-2-1: The master base station (or the central unit of the master base station, or the control plane portion of the central unit of the master base station) transmits a fourth notification message to the secondary base station (or the central unit of the base station, or the control plane portion of the central unit of the base station). The function of this message is to notify the status of the SCG/node. This message includes at least one of the following information:

Notification information related to activity status

Control information related to activity status

The above information may be the information included in the "first configuration request message" described with reference to FIG. 4.

Step 3-2-2: The central unit of the secondary base station (or the control plane portion of the central unit of the secondary base station) transmits a fifth notification message to the distributed unit of the secondary base station. The function of this message is to notify the status of the SCG/node. This message includes at least one of the following information:

Notification information related to activity status

Control information related to activity status

The above information may be the information included in the "first configuration request message" described with reference to FIG. 4.

Step 3-2-3: The control plane portion of the central unit of the secondary base station transmits a sixth notification message to the user plane portion of the central unit of the secondary base station. The function of this message is to notify the status of the SCG/node. This message includes at least one of the following information:

Notification information related to activity status

Control information related to activity status

The above information may be the information included in the "first configuration request message" described with reference to FIG. 4.

Procedure for configuring user, the function of which is to configure the data transmission of a user on the SCG, may include the following steps:

Step 3-3-1: The master base station or the secondary base station transmits a third message to the user, which includes information related to configuration of the data transmission of the user equipment on the SCG. In one implementation, the third message may be the first user configuration message, the function of which is to configure the user to activate or deactivate the SCG. According to the configuration message, the user may determine whether to continue the data transmission on the SCG. The configuration message may be a RRC message, or may be indication information of a MAC layer, or may be other types of indication information. The first user configuration message includes at least one of the following information:

Control information related to activity status

The above information may be the information included in the "first configuration request message" described with reference to FIG. 4.

Configuration procedure, the function of the process is to configure the detection of the activity status, or to configure the transmission of user data. The activity status may be the activity status of a node or the activity status of a SCG; the transmission of the user data may be the transmission of the user data on the node, may also be the transmission of user data served by the SCG. This procedure occurs before or after the above "detection procedure", or overlaps with the "detection procedure". This procedure may include the following steps (whether each step is executed or not is not restricted, and the execution order of various steps is not restricted):

Step 3-0-1: The central unit of the base station (or the control plane portion of the central unit of the base station) transmits a first configuration message to the distributed unit of the base station. The function of this message is to configure the distributed unit of the base station to perform detection of SCG/node status and/or to configure the transmission of the user data. In one embodiment, the base station is a secondary base station. The message includes at least one of the following information:

Configuration information related to data transmission

Information related to activity status detection time

The above information may be the information included in the "first configuration request message" described with reference to FIG. 4.

Step 3-0-2: The control plane portion of the central unit of the base station transmits a second configuration message to the user plane portion of the central unit of the base station. The function of this message is to configure the user plane portion of the central unit of the base station to perform detection of SCG/node status and/or to configure the transmission of the user data. In one embodiment, the base station is a secondary base station. The message includes at least one of the following information:

Configuration information related to data transmission

Information related to activity status detection time

The above information may be the information included in the "first configuration request message" described with reference to FIG. 4.

Step 3-0-3: The central unit of the base station (the base station is the secondary base station) (or the control plane portion of the central unit of the base station) transmits a third configuration message to the master base station (or the central unit of the master base station, or the control plane portion of the central unit of the master base station). The function of this message is to configure the master base station (or the central unit of the master base station, or the control plane portion of the central unit of the master base station) to perform detection of SCG/node status and/or to configure the transmission of the user data. In one embodiment, the base station is a secondary base station. The message includes at least one of the following information:

Configuration information related to data transmission

Information related to activity status detection time

The above information may be the information included in the "first configuration request message" described with reference to FIG. 4.

Step 3-0-4: The master base station (or the central unit of the master base station, or the control plane portion of the central unit of the master base station) transmits a fourth configuration message to the central unit of the base station (the base station is a secondary base station) (or the control plane portion of the central unit of the base station). The function of this message is to configure the central unit of the base station (or the control plane portion of the central unit of the base station) to perform detection of SCG/node status and/or to configure the transmission of the user data. This message includes at least one of the following information:

Configuration information related to data transmission

Information related to activity status detection time

The above information may be the information included in the "first configuration request message" described with reference to FIG. 4.

In one embodiment, after the above step 3-0-4, the above step 3-0-1 and step 3-0-2 may also be performed.

It should be noted that in the above three embodiments, the information included in the first message in the above step 1-1 is put in different procedures, respectively. However, in a real system, the information included in the first message may be put in one procedure for transmission, or may be put in different procedures to be transmitted, respectively. Therefore, the present disclosure does not restrict the procedure for carrying the information included in the first message, and it may be transmitted in one procedure or in a plurality of procedures.

The advantageous effects of the above exemplary procedure 1 include at least:

The network node can control the transmission of user data, and can also control the transmission of user data by a SCG, so as to control the use of nodes/SCGs and save the power of the user equipments.

The network node can detect the use of nodes/SCGs, so as to know whether it is required to activate or deactivate the use of the nodes/SCGs.

Configure network nodes to activate or deactivate SCGs, thereby reducing the power consumption of user equipments.

Notify the network node of the activation or deactivation of SCGs, thereby controlling the transmission of data to the nodes serving SCGs, thus reducing the power consumption of user equipments.

Exemplary Procedure 2

Figure 8:
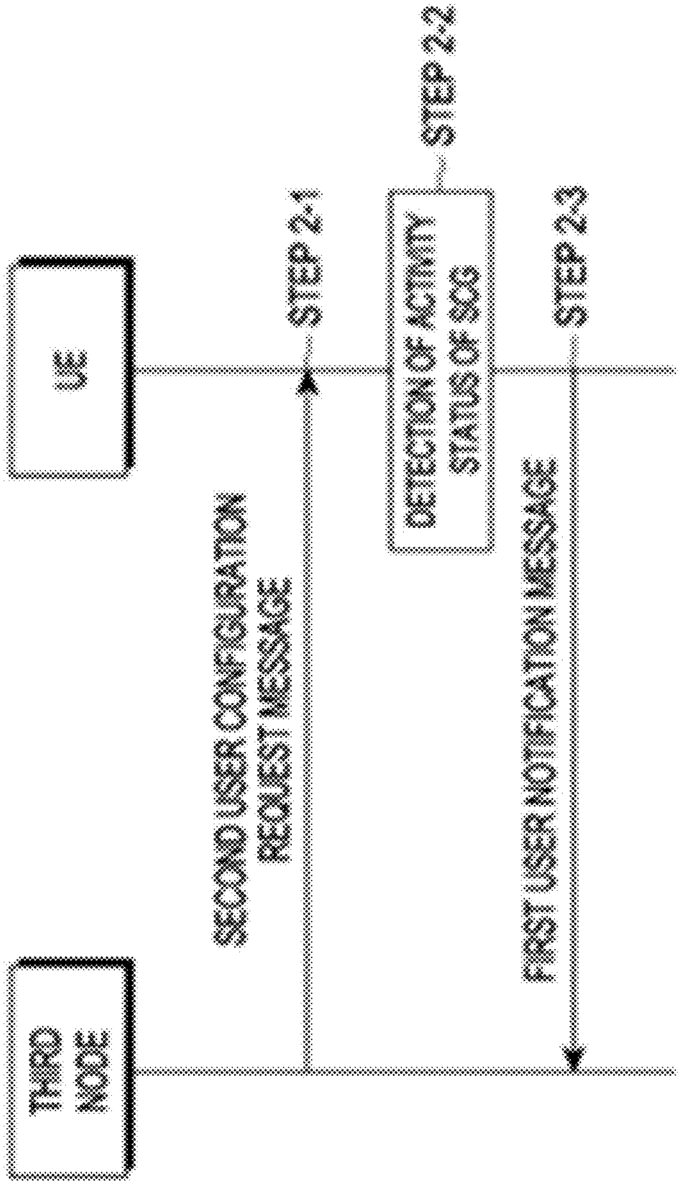
FIG. 8 is a flowchart of performing configuration related to activation/deactivation of SCG on a user equipment according to an exemplary embodiment of the present disclosure.

The configuration related to SCG activation and deactivation is performed with respect to the user equipment. The configuration includes transmission configuration of the user data, activation and deactivation of SCG, and detection of SCG status, etc. The exemplary procedure 2 may include the following steps, as shown in FIG. 8:

Step 2-1: A third node transmits a fourth message to user equipment. The fourth message includes information related to configuration of activation/deactivation of a SCG of the user equipment. In one implementation, the fourth message may be a second user configuration request message, and the function of this message is to perform the configuration related to SCG activation/deactivation with respect to the user equipment. The message may be a RRC message (such as an RRC Reconfiguration message) or other types of messages. This message includes at least one of the following information:

■ Configuration information related to SCG status, the function of which is to indicate the status of the SCG, such as activation status and deactivation status. In one embodiment, after receiving the information, the user equipment will determine whether to transmit data to the SCG (or to request data transmission), or to receive data from the SCG (or to detect the PDCCH of the SCG). In particular, if the SCG is in the activated status, the user equipment may transmit data to the SCG (or request data transmission), or receive data from the SCG (or detect the PDCCH of the SCG); if the SCG is in the deactivated status, the user equipment will not transmit data to the SCG (or will not request data transmission), or will not receive data from SCG (or will not detect the PDCCH of the SCG).

■ Configuration information related to data transmission, the function of which is to configure the user equipment to perform data transmission. The data may be downlink data, or may be uplink data, or may be uplink and downlink data. The configuration information may be applicable to one or more types of data, and for one type of the data, the information includes at least one of the following information:

▶ Second threshold information, which indicates the threshold for the user equipment to enable SCG to transmit data. In particular, when the data volume of the user equipment is greater than the threshold, the SCG may be enabled to transmit data, or when the data volume of the user equipment is less than the threshold, SCG may not be enabled to transmit data.

▶ Fourth time length information, which indicates the time length used to conduct statistics on the data volume of the user equipment. In one embodiment, if the data volume within the time indicated by the time length information exceeds the above second threshold information, SCG may be enabled to transmit data. In another embodiment, if the data volume within the time indicated by the time length information is less than the above second threshold information, SCG may not be enabled to transmit data.

▶ Fifth applicable information, which indicates the data to which the above "second threshold information" and/or "fourth time length information" is applicable, includes at least one of the following information:

Identification information of a user equipment, which indicates the identification of the user equipment to which the data belongs. If this information is included, it means that the above "second threshold information" and/or "fourth time length information" are user-level information.

Identification information of a PDU session, which indicates the identification of the PDU session to which the data belongs. If this information is included, it means that the above "second threshold information" and/or "fourth time length information" are PDU session-level information.

Identification information of a QoS flow, which indicates the identification of the QoS flow to which the data belongs. If this information is included, it means that the above "second threshold information" and/or "fourth time length information" are QoS flow-level information.

Identification information of a DRB, which indicates the identification of the DRB to which the data belongs. If this information is included, it means that the above "second threshold information" and/or "fourth time length information" are DRB-level information.

In one embodiment, if the above "fifth applicable information" is not included in the configuration information related to data transmission, the above "second threshold information" and/or "fourth time length information" are user-level information, and are applicable to data of one user equipment.

■ Information related to SCG activity status detection time, which is used to indicate the time length for the user equipment to detect the SCG activity status, includes at least one of the following information:

▶ Fifth time length information, which indicates the time length required to perform a detection operation on the activity status on the SCG.

▶ Sixth applicable information, which indicates data to which the above "fifth time length information" is applicable, and the information includes at least one of the following information:

The identification information of a user equipment, which indicates the identification of the user equipment to which the data belongs. If this information is included, it means that the above "fifth time length information" is user-level information.

The identification information of a PDU session, which indicates the identification of the PDU session to which the data belongs. If this information is included, it means that the above "fifth time length information" is PDU session-level information.

The identification information of a QoS flow, which indicates the identification of the QoS flow to which the data belongs. If this information is included, it means that the above "fifth time length information" is QoS flow-level information.

The identification information of a DRB, which indicates the identification of the DRB to which the data belongs. If this information is included, it means that the above "fifth time length information" is DRB-level information.

In one embodiment, if the above "sixth applicable information" is not included in the information related to SCG activity status detection time, the above "fifth time length information" is user-level information, and is applicable to data of one user equipment.

Step 2-2: Optionally, the user equipment detects the status of the SCG. In one implementation, the user equipment may detect the status of the SCG according to the configuration.

Step 2-3: Optionally, the user equipment transmits a fifth message to the third node, the fifth message includes information related to notification of the status of SCG. In one implementation, the fifth message may be the first user notification message, the function of this message is to notify the usage status of the SCG. The message may be an RRC message, or may be indication information of a MAC layer, or may be other types of indication information. This message includes at least one of the following information:

■ Indication information for requiring a SCG to transmit data, which informs the third node that the user equipment has data required to be transmitted by SCG ■ Indication information for not requiring a SCG to transmit data, which informs the third node that the user equipment does not have data required to be transmitted by SCG.

In one embodiment, the above steps 2-2 and 2-3 may be performed again according to the configuration in the above step 2-1. In another embodiment, the above steps 2-2 and 2-3 may also be performed independently.

The above third node may be a master base station, a secondary base station, a central unit of a master base station/a secondary base station, or a control plane portion of the central unit of the master base station/secondary base station.

The advantageous effects of the above exemplary procedure 2 include at least:

1. The user equipment may determine whether to use a SCG for data transmission according to the network configuration, thereby saving power of the user equipment.
2. The user equipment may detect the usage status of the SCG according to the configuration, and notify the network side, and thus activate or deactivate the SCG, which may save the power of the user equipment.
3. The user equipment may notify the network side of the arrival of user data after deactivating the SCG, so as to activate the SCG in time to ensure the timely transmission of user data.

1) The Advantageous Effects of the Disclosure

Based on the first aspect of the disclosure content, the advantageous effects brought by the present disclosure are at least:

Controlling the user data transmission performed by network nodes using the SCG, controlling the use of SCG, and avoiding the use of the SCG when the data volume is small, and thus saving the power of user equipments.

The network node may detect the SCG status, so that the data volume transmitted by the SCG may be found. When the data volume is small, the SCG may be deactivated to save the power of user equipments. When the data volume is large, the SCG may be activated to ensure the throughput required by user data transmission.

The network node may know the activation or deactivation status of the SCG, so that it may control whether to transmit user data to nodes serving the SCG, so as to avoid transmitting data to the deactivated SCGs, and to transmit data to the activated SCGs to ensure the timely transmission of data.

The network node may configure the activation or deactivation of the SCG, and decide whether to use the nodes served by the SCG to transmit data to user equipments, thereby saving the power of the user equipments.

Notifying the network node of the activation or deactivation of the SCG, and controlling the data transmission only to the nodes serving the SCG, thereby reducing the power consumption of the user equipments.

Based on the second aspect of the disclosure content, the advantageous effects brought by the present disclosure are at least:

The user equipment may activate or deactivate the SCG according to the configuration, and determine whether to use the SCG for user data transmission, thereby saving the power of the user equipment.

The user equipment may detect the status of the SCG according to the configuration and notify the network side, so as to activate or deactivate the SCG, which may save the power of the user equipment.

The user equipment may notify the network side of the arrival of user data after deactivating the SCG, so as to activate the SCG in time to ensure the timely transmission of user data.

Exemplary Procedure 3

This procedure is a procedure directed to a user equipment handover process. A new handover mechanism is given in the 3GPP Rel-16 protocol, namely the Dual Active Protocol Stack (DAPS) handover. In the handover mechanism, during the handover process, the user equipment may maintain communication with a source base station until the network side notifies the user equipment to release the communication with the source base station. When this mechanism is applied to a base station with a separate architecture (that is, a base station includes one central unit and one or more distributed units), there will be a problem of whether to let the distributed unit of the source base station stop transmitting user data. In non-DAPS handover, when the handover occurs on the user equipment, the distributed unit of the source base station needs to stop communication with the user equipment. In DAPS handover, based on the description in TS38.401 v16.3.0, the distributed unit of the source base station will not stop communication with the user equipment. However, DAPS handover is not applicable to all radio bearers of user equipment, that is, during the handover, there will be some radio bearers of user equipment (called DAPS bearers in the present disclosure) that may maintain communication with the source base station, yet there are some bearers that need not to maintain communication with the source base station (referred to as non-DAPS bearer in the present disclosure). For a radio bearer configured as a DAPS bearer, during the user equipment handover, on one hand, the user equipment completes the procedure of accessing the target base station; and on the other hand, the user equipment may perform data transmission of the radio bearer with the source base station. For radio bearers configured as non-DAPS bearers, during the user equipment handover process, the user equipment may only perform data transmission of the bearer with the target base station after successfully accessing the target base station. According to conventional technology, if only part of the radio bearers of the user equipment are configured as DAPS bearers during the handover process, the distributed unit of the source base station will still transmit data belonging to non-DAPS bearers, which is a waste of resources for the distributed unit of the source base station. At the same time, it may affect the data transmission of the DAPS bearers on the distributed unit of the source base station, resulting in a decrease in the performance of the DAPS bearers. Therefore, the present disclosure also proposes a data transmission control procedure, which involves the following nodes:

■ Fourth node: a central unit of a base station, or a control plane portion of the central unit of the base station. In one embodiment, the base station is the source base station in the user equipment handover process. In another embodiment, when a handover between two distributed units of a same base station occurs on the user equipment, the node is the central unit of the base station.

■ Fifth node: a distributed unit of the base station. In one embodiment, the base station is the source base station in the user equipment handover process. In another embodiment, when a handover between two distributed units of a same base station occurs on the user equipment, the node is the distributed unit (source distributed unit) connected by the user equipment before the handover.

Figure 9:
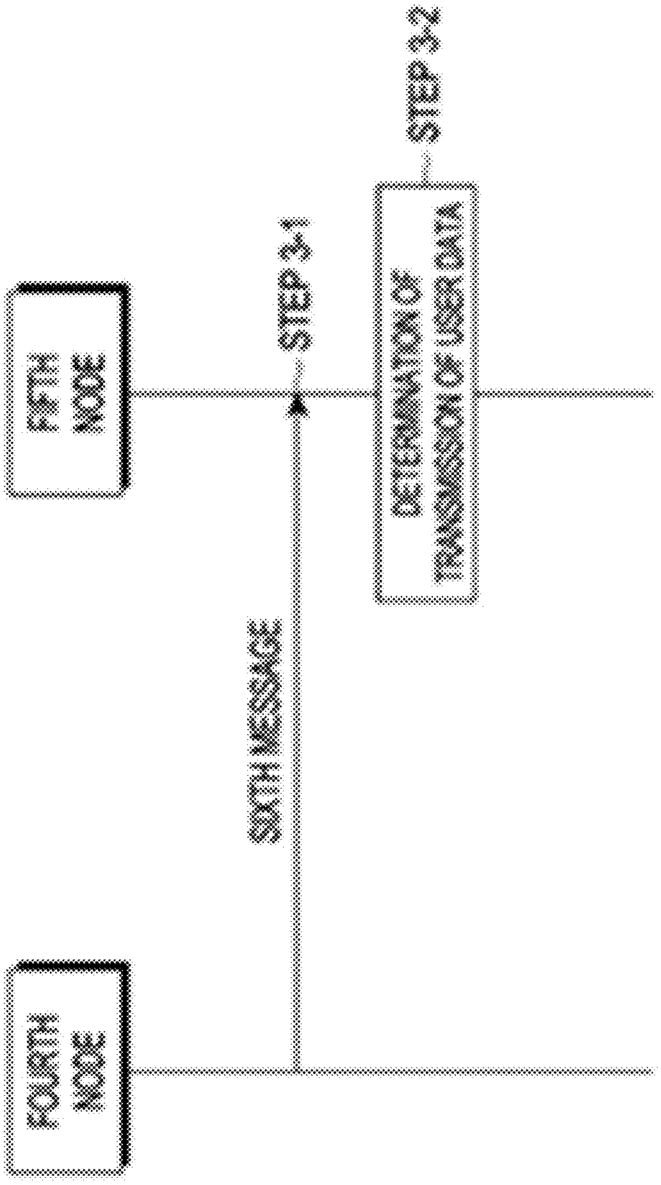
FIG. 9 is a flowchart of configuring user data transmission according to an exemplary embodiment of the present disclosure.

As shown in FIG. 9, the procedure includes the following steps:

Step 3-1: The fourth node transmits a sixth message to the fifth node. The function of this message is to configure the data transmission of the fifth node. The message includes information related to configuring the data transmission of the fifth node. In one embodiment, the sixth message may be a configuration message of the first user data. The message may include at least one of the following information:

■ Identification information of a user equipment, which indicates the user equipment to which the sixth message is directed. In one embodiment, the user equipment is the user equipment performing handover.

■ Information related to radio bearers, the function of this information is to provide the fifth node with information related to radio bearers of the user equipment. The radio bearer may be a data radio bearer (DRB), or may be a signaling radio bearer (SRB). For a radio bearer, the information may include at least one of the following information:

▶ Radio bearer identification information, such as a DRB ID, a SRB ID

▶ Indication information for DAPS configuration, the function of this information is to indicate whether the radio bearer is configured as a DAPS bearer, for example, the indication information may indicate "configured as a DAPS bearer" or "not configured as a DAPS bearer". In one embodiment, the indication information may be named "DAPS-config". If the indication information is set to "true", the radio bearer is configured as a DAPS bearer, and/or if the indication information is set to "false", the radio bearer is configured as a non-DAPS bearer (that is, the radio bearer is not configured as a DAPS bearer).

▶ First indication information for data transmission, the function of this information is to indicate whether the fifth node maintains the data transmission of the radio bearer with the user equipment, such as indicating "keep", "restart" (the function of this information is, if the fifth node stops the data transmission of the radio bearer before receiving the information, it may restart the data transmission of the radio bearer after receiving the information), or "do not keep (stop)". In one embodiment, the indication information may be named as Transmission Action Indicator, which may indicate "stop", "restart", or "keep".

■ Information of DAPS radio bearers, the function of this information is to indicate one or more radio bearers configured as DAPS bearers. For a radio bearer, the information may include at least one of the following information:

▶ Identification information of a radio bearer, which indicates the radio bearer configured as a DAPS bearer.

▶ Second indication information for data transmission, the function of this information is to indicate whether the fifth node maintains the data transmission of the radio bearer with the user equipment, such as indicating "keep", "restart" (the function of this information is, if the fifth node stops the data transmission of the radio bearer before receiving the information, it may restart the data transmission of the radio bearer after receiving the information), or "do not keep (stop)". In one embodiment, the indication information may be named as Transmission Action Indicator, which may indicate "stop", "restart", or "keep".

■ Information of non-DAPS radio bearers, the function of which is to indicate one or more radio bearers configured as non-DAPS bearers, the information may include at least one of the following information:

▶ Identification information of a radio bearer, which indicates the radio bearer configured as a non-DAPS bearer.

▶ Third indication information for data transmission, the function of this information is to indicate whether the fifth node maintains the data transmission of the radio bearer with the user equipment, such as indicating "keep", "restart" (the function of this information is, if the fifth node stops the data transmission of the radio bearer before receiving the information, it may restart the data transmission of the radio bearer after receiving the information), or "do not keep (stop)". In one embodiment, the indication information may be named as Transmission Action Indicator, which may indicate "stop", "restart", or "keep".

■ Fourth indication information for data transmission, the function of this information is to indicate whether the fifth node maintains data transmission with the user equipment (the data may be data of one or more or all of the radio bearers of the user equipment), such as indicating "keep", "restart" (the function of this information is, if the fifth node stops the data transmission of one or more or all of the radio bearers before receiving the information, it may restart the data transmission of one or more or all of the radio bearers after receiving the information), or "do not keep (stop)". In one embodiment, the indication information may be named as Transmission Action Indicator, which may indicate "stop", "restart", or "keep".

Step 3-2: The fifth node determines the transmission of user data according to the received sixth message, that is, the fifth node determines one or more radio bearers to continue data transmission with the user equipment. In particular, according to the information included in the sixth message, there may be the following implementations:

■ Implementation 1: Determine the transmission of user data according to the "fourth indication information for data transmission"

If the "fourth indication information for data transmission" indicates "keep", continue the data transmission of one or more or all of the radio bearers; if the "fourth indication information for data transmission" indicates "restart", restart the data transmission of one or more or all of the radio bearers; and if the "fourth indication information for data transmission" indicates "do not keep (stop)", stop the data transmission of one or more or all of the radio bearers.

■ Implementation 2: Determine the transmission of user data according to the "information related to radio bearers"

In one embodiment, the transmission of user data is determined according to the "Indication information for DAPS configuration" for each radio bearer in the "information related to radio bearers". If the "Indication information for DAPS configuration" of one radio bearer indicates that the radio bearer is a DAPS bearer, the fifth node continues data transmission of the radio bearer with the user equipment; if the "Indication information for DAPS configuration" of one radio bearer indicates that the radio bearer is a non-DAPS bearer, the fifth node stops data transmission of the radio bearer with the user equipment.

In another embodiment, the transmission of user data is determined according to the "first indication information for data transmission" for each radio bearer in "information related to radio bearers". If the "first indication information for data transmission" indicates "keep", continue the data transmission of the radio bearer; if the "first indication information for data transmission" indicates "restart", restart the data transmission of the radio bearer; and if the "first indication information for data transmission" indicates "do not keep (stop)", stop the data transmission of the radio bearer.

■ Implementation 3: Determine the transmission of user data according to "information of DAPS radio bearer"

In one embodiment, the transmission of user data is determined according to the identification information of one or more radio bearers included in the "Information of the DAPS radio bearer", that is, the fifth node continues the data transmission of one or more radio bearers as indicated by the "Information of the DAPS radio bearer" with the user equipment.

In another embodiment, the transmission of user data is determined according to the "second indication information for data transmission" for each indicated radio bearer in the "information of DAPS radio bearer". If the "second indication information for data transmission" indicates "keep", continue the data transmission of the radio bearer; if the "second indication information for data transmission" indicates "restart", restart the data transmission of the radio bearer; and if the "second indication information for data transmission" indicates "do not keep (stop)", stop the data transmission of the radio bearer.

■ Implementation 4: Determine the transmission of user data according to "information of non-DAPS radio bearers"

In one embodiment, the transmission of user data is determined according to the identification information of one or more radio bearers included in the "information of non-DAPS radio bearers", that is, the fifth node stops the data transmission of one or more radio bearers as indicated by the "Information of the non-DAPS radio bearer" with the user equipment.

In another embodiment, the transmission of user data is determined according to the "third indication information for data transmission" for each indicated radio bearer in the "information of non-DAPS radio bearers". If the "third indication information for data transmission" indicates "keep", continue the data transmission of the radio bearer; if the "third indication information for data transmission" indicates "restart", restart the data transmission of the radio bearer; and if the "third indication information for data transmission" indicates "do not keep (stop)", stop the data transmission of the radio bearer.

■ Implementation 5: Determine the transmission of user data according to "fourth indication information for data transmission" and "information related to radio bearers"

When the "fourth indication information for data transmission" indicates "do not keep (stop)", for a radio bearer, if the "Indication information for DAPS configuration" included in the "information related to radio bearer" indicates that the radio bearer is a DAPS bearer, the fifth node continues the data transmission of the radio bearer with the user equipment; if the "Indication information for DAPS configuration" included in the "information related to radio bearer" indicates that the radio bearer is a non-DAPS bearer, the fifth node stops the data transmission of the radio bearer with the user equipment.

■ Implementation 6: Determine the transmission of user data according to "fourth indication information for data transmission" and "information of the DAPS radio bearer"

When the "fourth indication information for data transmission" indicates "do not keep (stop)", for one or more radio bearers indicated by the "Information of the DAPS radio bearer", that is, these radio bearers configured as DAPS bearers, the fifth node continues the data transmission of the one or more radio bearers with the user equipment; for one or more radio bearers not indicated by the "Information of the DAPS radio bearer", that is, these radio bearers configured as non-DAPS bearers, the fifth node stops data transmission of the one or more radio bearers with the user equipment.

■ Implementation 7: Determine the transmission of user data according to "fourth indication information for data transmission" and "information of non-DAPS radio bearers"

When the "fourth indication information for data transmission" indicates "do not keep (stop)", for one or more radio bearers indicated by the "Information of the non-DAPS radio bearers", that is, these radio bearers configured as non-DAPS bearers, the fifth node stops data transmission of the one or more radio bearers with the user equipment; for one or more radio bearers not indicated by the "Information of the non-DAPS radio bearers", that is, these radio bearers configured as DAPS bearers, the fifth node continues the data transmission of the one or more radio bearers with the user equipment.

Optionally, after step 3-2, data transmission between the fifth node and the user equipment may also be included.

The sixth message in the above procedure may be an F1AP message of the F1 interface, such as a user equipment context modification request (UE Context Modification Request) message, a downlink RRC message transfer (DL RRC Message Transfer) message, or may be other types of messages.

In the description of the above procedure, it is assumed that the user equipment is in the handover process, the procedure occurs on the source base station side. For other procedures in the entire handover process, they are not given because they are irrelevant to the inventive concept of the present disclosure, and the specific procedure may be referred to TS38.300 and TS38.401.

Further, in the above procedure, the fourth node and the fifth node are the nodes involved in the user equipment handover process, however, this procedure is not limited to the handover process, and may also be used in other processes.

Further, in the above procedure, the fourth node is the central unit of the base station or the control plane portion of the central unit of the base station, and the fifth node is the distributed unit of the base station. However, the procedure is not limited to the interaction between these two types of nodes, and is also applicable for other types of nodes (such as the fourth node and the fifth node are two different base stations, central units of two different base stations, or the control plane portions of the central units of two different base stations).

The advantageous effects of this exemplary procedure 3 include at least: the network node (such as the distributed unit of the base station) may know the configuration of data transmission with the user equipment according to the interaction of the procedure, determine the radio bearers required to maintain the data transmission, save the resources of the network node, and ensure the continuity of user data transmission.

Figure 10:
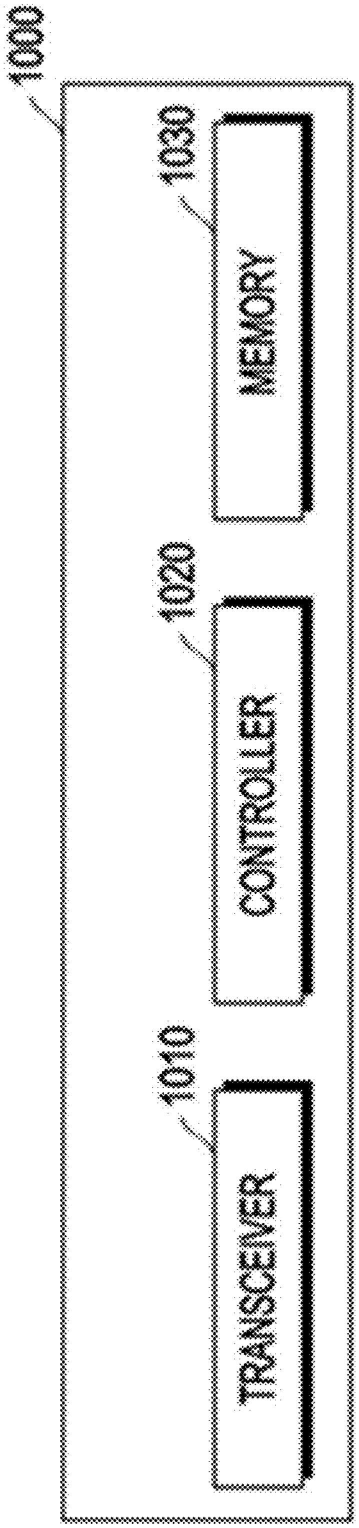
FIG. 10 is a block diagram of a node according to an exemplary embodiment of the present disclosure.

FIG. 10 is a block diagram of a node according to an exemplary embodiment of the present disclosure. Here, a node is taken as an example to illustrate the structure and function thereof. However, it should be understood that the structure and function shown may also be applicable to a base station (or a central unit of the base station, or a control plane portion of the central unit of the base station, or a user plane portion of the central unit of the base station, or a distributed unit of the base station, etc.).

Referring to FIG. 10, the node 1000 includes a transceiver 1010, a controller 1020, and a memory 1030. Under the control of the controller 1020 (which may be implemented as one or more processors), the node 1000 (which includes the transceiver 1010 and the memory 1030) is configured to perform the operations of the nodes in the procedures shown in FIGS. 4-9 or described above. Although the transceiver 1010, the controller 1020, and the memory 1030 are shown as separate entities, they may be implemented as a single entity, such as a single chip. The transceiver 1010, the controller 1020, and the memory 1030 may be electrically connected or coupled to each other. The transceiver 1010 may transmit and receive signals to and from other network entities, such as another node and/or a UE, etc. In one implementation, the transceiver 1010 may be omitted, and in this case, the controller 1020 may be configured to execute instructions (including computer programs) stored in the memory 1030 to control the overall operation of the node 1000, thereby implementing operations of the nodes in the procedures shown in FIGS. 4-9 or described above.

Figure 11:
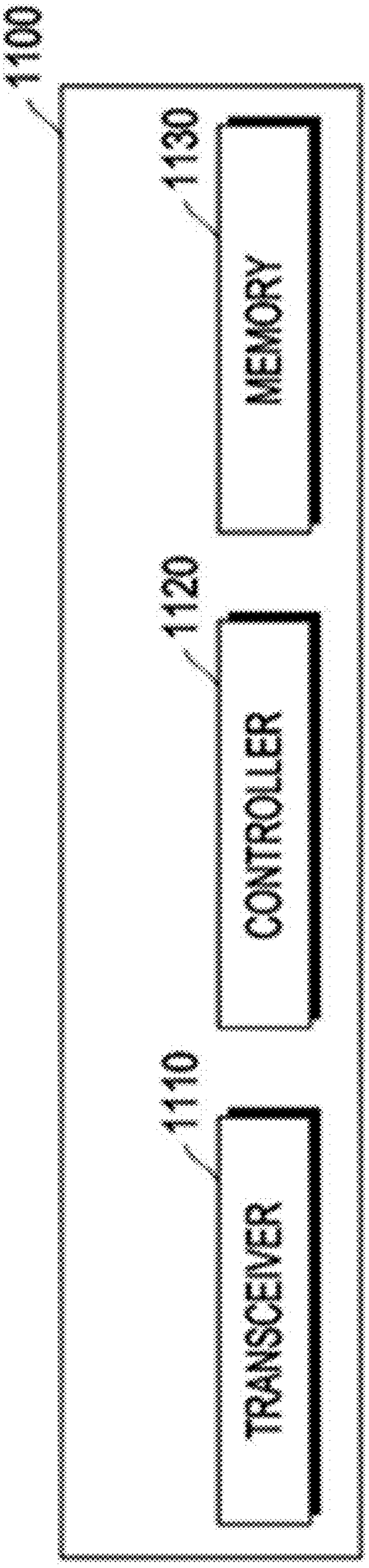
FIG. 11 is a block diagram of a user equipment according to an exemplary embodiment of the present disclosure.

FIG. 11 is a block diagram of a user equipment according to an exemplary embodiment of the present disclosure.

Referring to FIG. 11, the user equipment 1100 includes a transceiver 1110, a controller 1120, and a memory 1130. Under the control of the controller 1120 (which may be implemented as one or more processors), the user equipment 1100 (which includes the transceiver 1110 and the memory 1130) is configured to execute operations of the user equipment in the procedures shown in FIGS. 5-8 or described above. Although the transceiver 1110, the controller 1120, and the memory 1130 are shown as separate entities, they may be implemented as a single entity, such as a single chip. The transceiver 1110, the controller 1120, and the memory 1130 may be electrically connected or coupled to each other. The transceiver 1110 may transmit and receive signals to and from other network entities, such as a node, another UE, etc. In one implementation, the transceiver 1110 may be omitted, and in this case, the controller 1120 may be configured to execute instructions (including computer programs) stored in the memory 1130 to control the overall operation of the user equipment 1100, thereby performing operations of user equipment in the procedures shown in FIGS. 5-8 or described above.

Those skilled in the art may realize that the present disclosure may be implemented in other specific forms without changing the technical idea or basic features of the present disclosure. Therefore, it should be understood that the above embodiments are merely examples and not restrictive. The scope of the present disclosure is defined by the appended claims rather than the detailed descriptions. Therefore, it should be understood that all modifications or variations derived from the meaning and scope of the appended claims and the equivalents thereof fall within the scope of the present disclosure.

In the above embodiments of the present disclosure, all operations and messages may be selectively performed or omitted. Additionally, the operations in each embodiment need not to be performed sequentially, and the order of the operations may be changed. Messages do not need to be delivered in order, and the delivery order of messages may be changed. Each operation and each message delivery may be performed independently.

Although the present disclosure has been shown and described with reference to various embodiments of the present disclosure, those skilled in the art will understand that various changes may be made in form and in details without departing from the spirit and scope of the present disclosure defined by the appended claims and the equivalents thereof.

The invention claimed is:

1. A method performed by a next generation nodeb (gNB)-central unit (CU) in a wireless communication system, the method comprising:

transmitting, to a source gNB-distributed unit (DU), a user equipment (UE) context modification request message including information related to data transmissions for one or more data radio bearers (DRBs); and keeping a data transmission for at least one DRB configured with a dual active protocol stack (DAPS) during a handover, wherein the information includes identities of the one or more DRBs, and an indication to stop a data transmission of at least one DRB, among the one or more DRBs, not subject to a DAPS handover, and wherein the data transmission for the at least one DRB not subject to the DAPS handover is stopped at the source gNB-DU.

2. A method performed by a source next generation nodeb (gNB)-distributed unit (DU) in a wireless communication system, the method comprising:

receiving, from a gNB-central unit (CU), a user equipment (UE) context modification request message including information related to data transmissions for one or more data radio bearers (DRBs); and determining the data transmissions for the one or more DRBs based on the UE context modification request message, wherein the information includes identities of the one or more DRBs, and an indication to stop a data transmission of at least one DRB not subject to a dual active protocol stack (DAPS) handover identified among the identities of the one or more DRBs, and wherein the data transmission for the at least one DRB not subject to the DAPS handover is stopped at the source gNB-DU.

3. A next generation nodeb (gNB)-central unit (CU) in a wireless communication system, the gNB-CU comprising:

a memory;

a transceiver; and at least one processor connected to the memory and the transceiver, wherein the at least one processor is configured to:

transmit, to a source gNB-distributed unit (DU), a user equipment (UE) context modification request message including information related to data transmissions for one or more data radio bearers (DRBs), and keep a data transmission for at least one DRB configured with a dual active protocol stack (DAPS) during a handover, wherein the information includes identities of the one or more DRBs, and an indication to stop a data transmission of at least one DRB, among the one or more DRBs, not subject to a DAPS handover, and wherein the data transmission for the at least one DRB not subject to the DAPS handover is stopped at the source gNB-DU.

4. A source next generation nodeb (gNB)-distributed unit (DU) in a wireless communication system, the source gNB-DU comprising:

a memory;

a transceiver; and at least one processor connected to the memory and the transceiver, wherein the at least one processor is configured to:

receive, from a gNB-central unit (CU), a user equipment (UE) context modification request message including information related to data transmissions for one or more data radio bearers (DRBs), and determine the data transmissions for the one or more DRBs based on the UE context modification request message, wherein the information includes identities of the one or more DRBs, and an indication to stop a data transmission of at least one DRB not subject to a dual active protocol stack (DAPS) handover identified among the identities of the one or more DRBs, and wherein the data transmission for the at least one DRB not subject to the DAPS handover is stopped at the source gNB-DU.

* * * * *